US010436961B2

(12) United States Patent
Choi et al.

(10) Patent No.: US 10,436,961 B2
(45) Date of Patent: Oct. 8, 2019

(54) POLARIZATION FILM, DISPLAY APPARATUS INCLUDING THE SAME, AND MANUFACTURING METHOD FOR THE SAME

(71) Applicant: SAMSUNG ELECTRONICS CO., LTD., Suwon-si (KR)

(72) Inventors: Jun Sung Choi, Yongin-si (KR); Won Yong Lee, Suwon-si (KR); Ju Seong Hwang, Cheonan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 358 days.

(21) Appl. No.: 14/873,822

(22) Filed: Oct. 2, 2015

(65) Prior Publication Data
US 2016/0124132 A1 May 5, 2016

(30) Foreign Application Priority Data
Oct. 13, 2014 (KR) .......................... 10-2014-0137406

(51) Int. Cl.
*G02B 5/30* (2006.01)
*G02B 5/22* (2006.01)
(Continued)

(52) U.S. Cl.
CPC ............ *G02B 5/3041* (2013.01); *G02B 5/22* (2013.01); *G02B 5/305* (2013.01); *G02B 5/3083* (2013.01);
(Continued)

(58) Field of Classification Search
None
See application file for complete search history.

(56) References Cited

U.S. PATENT DOCUMENTS 6,008,871 A * 12/1999 Okumura ............ G02F 1/13362
349/113
7,379,243 B2 * 5/2008 Horsten ................... G02B 5/08
359/320
(Continued)

FOREIGN PATENT DOCUMENTS

EP    1 376 207 A1    1/2004
EP    2 407 820 A1    1/2012

OTHER PUBLICATIONS

Communication dated Feb. 11, 2016 issued by the European Patent Office in counterpart European Patent Application No. 15188207.3.
(Continued)

*Primary Examiner* — Derek S. Chapel
(74) *Attorney, Agent, or Firm* — Sughrue Mion, PLLC

(57) ABSTRACT

A polarization film and a display apparatus are provided. The polarization film includes first polarization layers and second polarization layers. The first polarization layers have a first refractive index with respect to a first polarization; and the second polarization layers have a second refractive index with respect to the first polarization and are arranged in each interval between the first polarization layers. The first polarization layers reflect light of the first polarization having color coordinates based on a thickness of the first polarization layers, at a boundary that touches the second polarization layers. The display apparatus includes a display panel and the polarization film.

37 Claims, 23 Drawing Sheets

(51) Int. Cl.
*G02B 27/28* (2006.01)
*G02F 1/1335* (2006.01)

(52) U.S. Cl.
CPC ..... *G02B 27/288* (2013.01); *G02F 1/133533* (2013.01); *G02F 1/133536* (2013.01); *G02F 2001/133531* (2013.01); *G02F 2001/133545* (2013.01); *G02F 2001/133562* (2013.01)

(56) References Cited

U.S. PATENT DOCUMENTS

| | | | | |
|---|---|---|---|---|
| 7,852,560 | B2* | 12/2010 | Ouderkirk | B29C 55/023 |
| | | | | 349/113 |
| 2004/0051827 | A1* | 3/2004 | Hinata | G02F 1/133528 |
| | | | | 349/113 |
| 2009/0296190 | A1* | 12/2009 | Anderson | B32B 27/06 |
| | | | | 359/247 |
| 2014/0092466 | A1 | 4/2014 | Wang et al. | |
| 2015/0049283 | A1* | 2/2015 | Hwang | G02F 1/133536 |
| | | | | 349/96 |
| 2015/0177563 | A1* | 6/2015 | Cho | G02F 1/133536 |
| | | | | 349/96 |

OTHER PUBLICATIONS

Communication dated May 14, 2019 issued by the European Patent Office in counterpart European Patent Application No. 15188207.3.

* cited by examiner

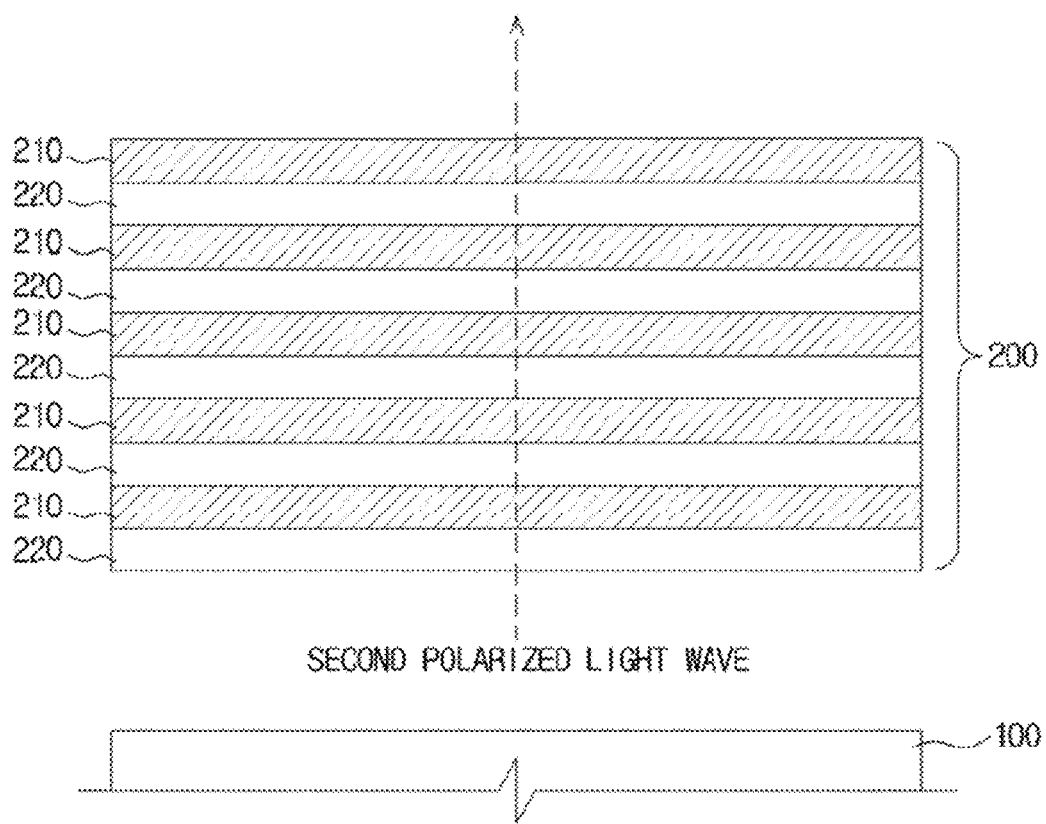

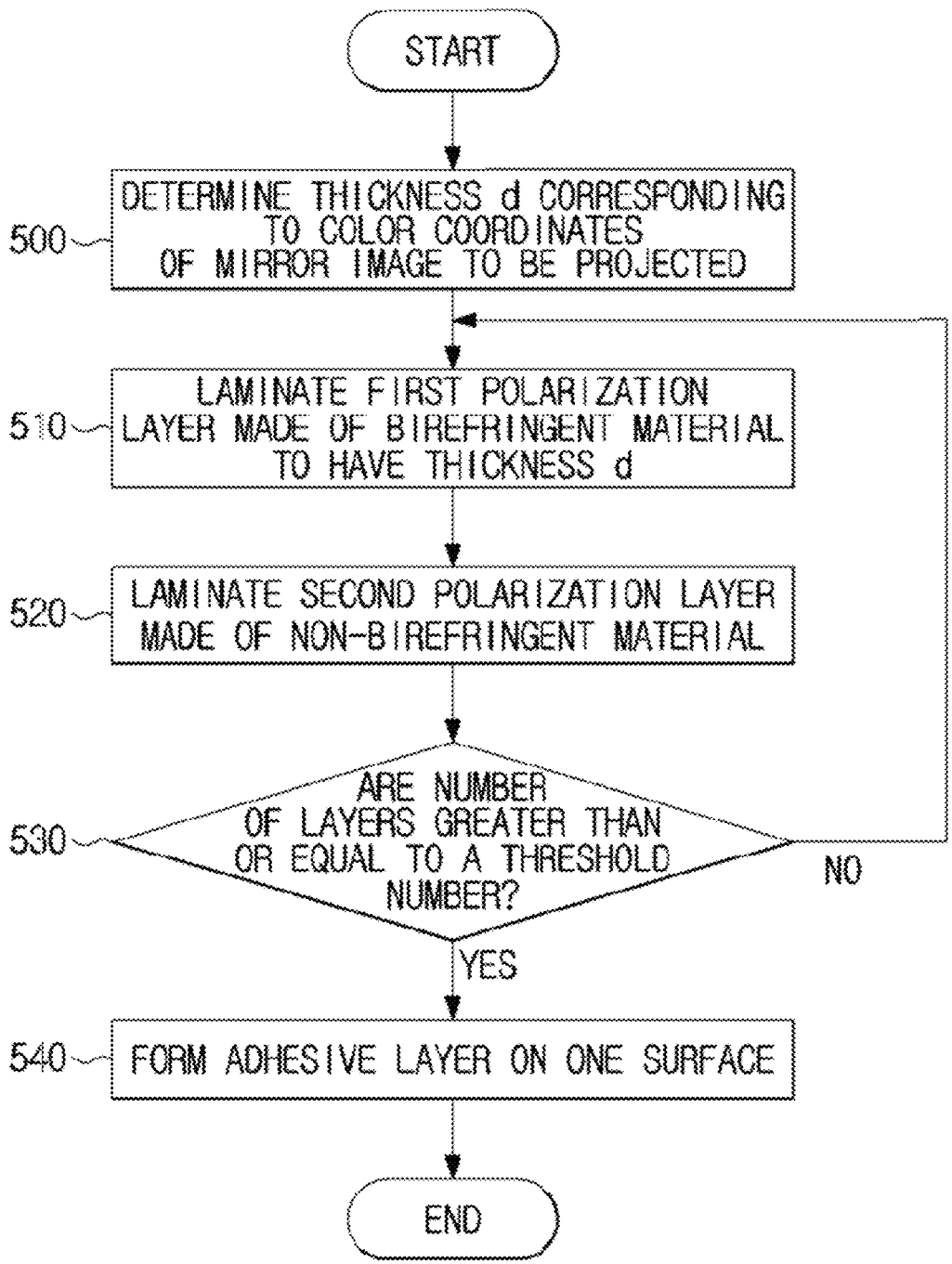

POLARIZATION FILM, DISPLAY APPARATUS INCLUDING THE SAME, AND MANUFACTURING METHOD FOR THE SAME

CROSS-REFERENCE TO RELATED APPLICATION

This application claims the benefit of Korean Patent Application No. 2014-0137406, filed on Oct. 13, 2014 in the Korean Intellectual Property Office, the disclosure of which is herein incorporated by reference.

BACKGROUND

1. Field

Exemplary embodiments relate to a polarization film that performs a mirror function, a display apparatus including the polarization film, and a manufacturing method for the display apparatus.

2. Description of the Related Art

A display apparatus may refer to an apparatus that includes a display panel for displaying images and that displays broadcasting signals or image signals/image data of various formats.

The display panel may be classified into an emissive display panel that spontaneously emits light and a non-emissive display panel that cannot spontaneously emit light. Examples of the emissive display panel may include a cathode ray tube (CRT) panel, an electroluminescence (EL) panel, an organic light emitting diode (OLED) panel, a vacuum fluorescent display (VFD) panel, a field emission display (FED) panel, a plasma display panel (PDP), and the like, and examples of the non-emissive display panel may include a liquid crystal display (LCD) panel, and the like.

In recent years, such a display apparatus may function as a mirror as well as displaying images. Through this, a user may receive an image generated by the display apparatus when the power supply of the display apparatus is turned on, and may receive a reflected image of an object that faces the display apparatus when the power supply thereof is turned off.

SUMMARY

It is an aspect to provide a polarization film that may make light that transmits an image displayed on a display panel and reflects light of predetermined color coordinates of external light of the outside, a display apparatus including the polarization film, and a manufacturing method for the display apparatus.

In accordance with an aspect of one or more exemplary embodiments, there is provided a polarization film comprising a plurality of first polarization layers that have a first refractive index with respect to a first polarization; and a plurality of second polarization layers that have a second refractive index with respect to the first polarization and are arranged in each interval between the plurality of first polarization layers, wherein the plurality of first polarization layers reflect light of the first polarization having color coordinates based on a thickness of the first polarization layers, at a boundary that touches the plurality of second polarization layers.

The plurality of first polarization layers may reflect light of the first polarization except for light having a frequency component corresponding to the thickness.

The plurality of first polarization layers may reflect light of the first polarization having color coordinates that are determined according to the frequency component.

The plurality of first polarization layers may absorb light having a frequency component corresponding to the thickness of the first polarization layers from among light of the first polarization that is incident on the polarization film.

In the plurality of first polarization layers, the absorbed frequency of light of the first polarization may decrease as the thickness of the first polarization layers increases.

The plurality of first polarization layers may have the second refractive index with respect to a second polarization perpendicular to the first polarization, and the plurality of second polarization layers may have the second refractive index with respect to the second polarization.

The plurality of first polarization layers and the plurality of second polarization layers may transmit light of the second polarization through the polarization film.

Each of the plurality of first polarization layers may be made of a birefringent material.

Each of the plurality of first polarization layers may have a same thickness.

The polarization film may further comprise an adhesive layer that is provided on the polarization film to adhere the polarization film to a display panel for displaying an image comprising light of the second polarization, and the second polarization may be perpendicular to the first polarization.

In accordance with another aspect of one or more exemplary embodiments, there is provided a display apparatus comprising a display panel that displays an image comprising light of a second polarization; and a polarization film that transmits light of the second polarization through the polarization film to provide the image, wherein, when light of a first polarization perpendicular to the second polarization is incident on the polarization film, the polarization film reflects the light of the first polarization having predetermined color coordinates.

The polarization film may project a mirror image of an object by reflecting light of the first polarization, and the mirror image may have the predetermined color coordinates.

The polarization film may comprise a plurality of first layers and a plurality of second layers laminated together, the first layers having a different refractive index with respect to the first polarization than the second layers.

The polarization film may reflect light of the first polarization having the predetermined color coordinates at boundaries between the first and second layers.

Each of the first layers and each of the second layers may have a same refractive index with respect to the second polarization.

The polarization film may further include a plurality of first polarization layers that have a first refractive index with respect to the first polarization, and a plurality of second polarization layers that have a second refractive index with respect to the first polarization and are arranged in each interval between the plurality of first polarization layers, and the plurality of first polarization layers may reflect light of the first polarization having color coordinates based on a thickness of the first polarization layers, at boundaries that touch the plurality of second polarization layers.

The plurality of first polarization layers may reflect light of the first polarization except for light having a frequency component corresponding to the thickness of the first polarization layers.

The plurality of first polarization layers may reflect light of the first polarization having color coordinates that are determined according to the frequency component.

The plurality of first polarization layers may absorb light having a frequency component corresponding to the thickness of the first polarization layers from among light of the first polarization that is incident on the polarization film.

In the plurality of first polarization layers, the absorbed frequency of light of the first polarization may decrease as the thickness increases.

Each of the plurality of first polarization layers and each of the plurality of second polarization layers may have the second refractive index with respect to the second polarization.

Each of the plurality of first polarization layers may be made of a birefringent material.

Each of the plurality of first polarization layers may have a same thickness.

The polarization film may include an adhesive layer that adheres the polarization film to the display panel.

In accordance with another aspect of one or more exemplary embodiments, there is provided a manufacturing method for a display apparatus, the method comprising preparing a display panel that displays an image comprising light of a second polarization; preparing a polarization film that transmits light of the second polarization through the polarization film; and adhering the polarization film to one surface of the display panel on which the image of the display panel is displayed, wherein the polarization film is prepared such that when light of a first polarization that is perpendicular to the second polarization is incident to the polarization film, the polarization film reflects the light of the first polarization that has predetermined color coordinates.

The preparing of the polarization film may include preparing the polarization film that projects a mirror image of an object by reflecting light of the first polarization, the mirror image having the predetermined color coordinates.

The preparing of the polarization film may include repeatedly laminating two layers, each having a different refractive index with respect to the first polarization.

The preparing of the polarization film may include preparing the polarization film that reflects light of the first polarization having the predetermined color coordinates at boundaries of the two layers.

Each of the two layers may have a same refractive index with respect to the second polarization.

The preparing of the polarization film may include repeatedly laminating a first polarization layer having a first refractive index with respect to the first polarization, and a second polarization layer having a second refractive index with respect to the first polarization.

The repeatedly laminating of the first polarization layer and the second polarization layer may include laminating the first polarization layers that have a thickness corresponding to the color coordinates so that light of the first polarization having the color coordinates is reflected.

The laminating of the first polarization layer may include determining the thickness of the first polarization layer so that light of a frequency component determined by the color coordinates is removed from the reflected light of the first polarization.

The repeatedly laminating of the first polarization layer and the second polarization layer may include laminating the first polarization layer and the second polarization layer having the second refractive index with respect to light of the second polarization so that the polarization film transmits light of the second polarization through the polarization film.

The first polarization layer may be made of a birefringent material.

Each of the first polarization layers may have a same thickness.

The preparing of the polarization film may include preparing an adhesive layer that adheres the polarization film to the display panel.

In accordance with another aspect of one or more exemplary embodiments, there is provided a display apparatus comprising a display panel; and a polarization film provided on the display panel, wherein the polarization film comprises a first layer having a first refractive index at a first polarization and a second refractive index that is different from the first refractive index at a second polarization, and a second layer having the second refractive index at the first polarization and at the second polarization.

The first layer may be made of a birefringent material.

The second layer may be made of a material having no birefringence.

The polarization film may comprise a plurality of the first layers and a plurality of the second layers, the first layers alternating with the second layers.

The polarization film may be adhered to the display panel with an adhesive layer.

BRIEF DESCRIPTION OF THE DRAWINGS

These and/or other aspects will become apparent and more readily appreciated from the following description of exemplary embodiments, taken in conjunction with the accompanying drawings of which:

FIGS. 5A, 5B, and 6 are views for describing an optical property of a polarization film according to an exemplary embodiment;

FIG. 19 is a flowchart showing a manufacturing method for a polarization film according to an exemplary embodiment.

DETAILED DESCRIPTION

Figure 1:
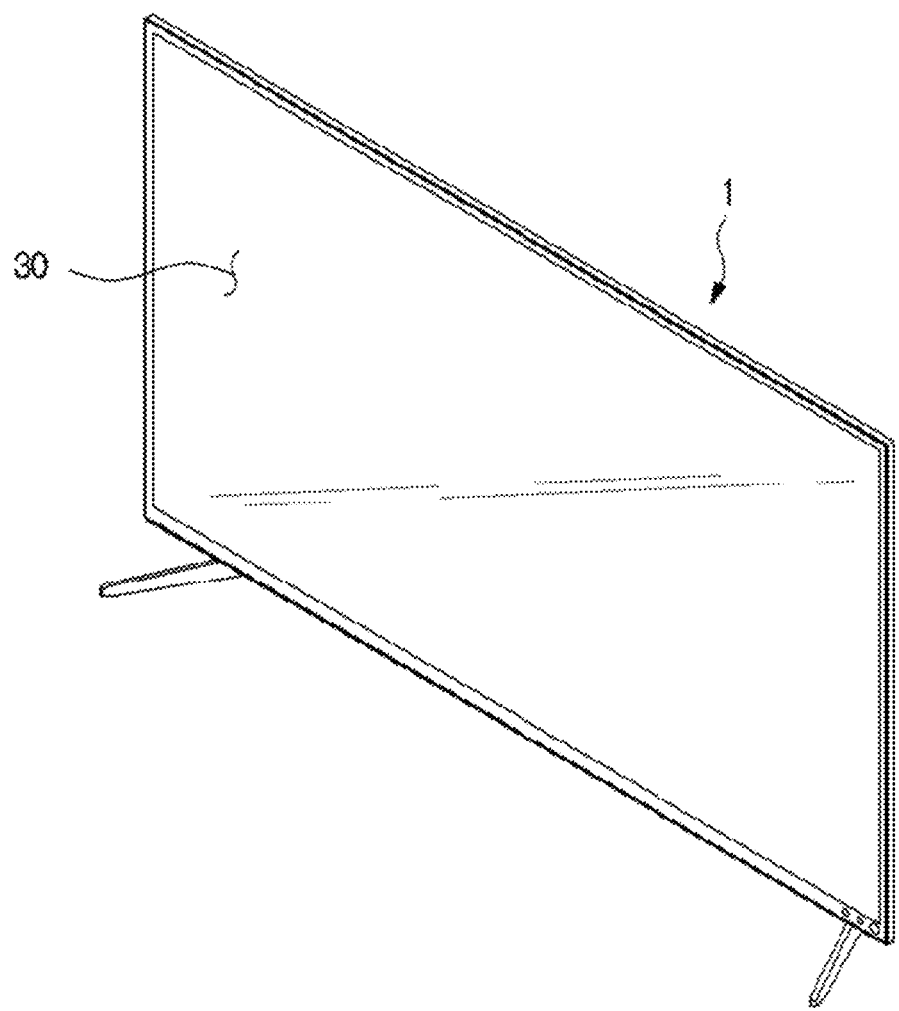
FIG. 1 is an outline view showing a display apparatus according to an exemplary embodiment.

Reference will now be made in detail to exemplary embodiments, examples of which are illustrated in the accompanying drawings, wherein like reference numerals refer to like elements throughout.

Hereinafter, a polarization film, a display apparatus including the polarization film, and a manufacturing method for the display apparatus will be described in detail with reference to the accompanying drawings.

FIG. 1 is an outline view showing a display apparatus according to an exemplary embodiment.

As shown in FIG. 1, a display apparatus 1 is an apparatus that may process image signals received from the outside and spontaneously display the processed images. In FIG. 1, a case in which the display apparatus is a television (TV) is illustrated. However, the display apparatus may be implemented by various methods such as a TV, a monitor, a portable multimedia player, a mobile phone, and the like, and is not limited as long as the display apparatus includes a display panel 30 for displaying images.

The display panel 30 spontaneously generates light for displaying images or receives the light from other components. The display panel 30 such as an organic light emitting diode (OLED) panel spontaneously generates light to display images. Meanwhile, the display panel such as a liquid crystal display (LCD) panel does not spontaneously generate light, and receives light generated from a backlight (not shown).

The display panel 30 may display an image constituted of such light on a plate surface. Specifically, the display panel 30 may emit the light constituting the image from the whole plate surface to the outside, and therefore a user can recognize the image displayed on the plate surface.

Figure 2:
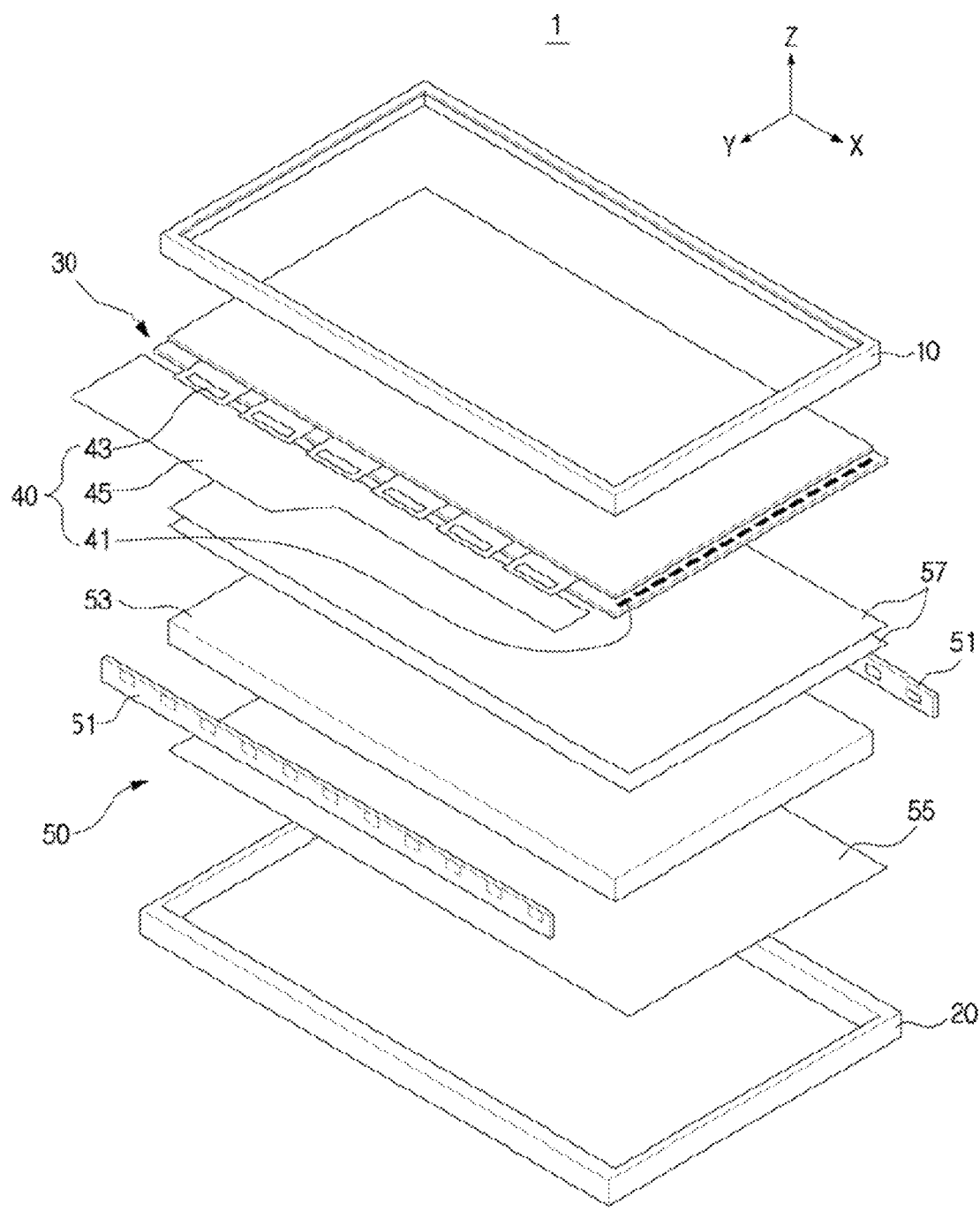
FIG. 2 is an exploded perspective view showing a display apparatus.

FIG. 2 is an exploded perspective view showing a display apparatus. In FIG. 2, the display apparatus 1 including a display panel 30 having the configuration of the LCD panel will be described.

As shown in FIG. 2, the display apparatus 1 may include covers 10 and 20 that form a receiving space therein, a display panel 30 that is received in the receiving space formed by the covers 10 and 20 and displays an image on an upper plate surface, a panel driver 40 that drives the display panel 30, and a backlight 50 that is disposed to face a lower plate surface of the display panel 30 within the receiving space formed by the covers 10 and 20 and supplies light to the display panel 30.

Each direction shown in FIG. 2 will be first described. X, Y, and Z directions respectively indicate longitudinal, lateral, and height directions of the display panel 30. In FIG. 2, the display panel 30 is disposed on an X-Y plane, and the covers 10 and 20, the display panel 30, and the backlight 50 are arranged to be laminated along an axis line of the Z direction. The opposite directions of X, Y, and Z directions are respectively indicated by −X, −Y, and −Z directions, and the X-Y plane refers to a plane defined by the axis of X and Y directions.

In addition, unless otherwise stated, "upper" or "above" refers to the Z direction, and "lower" or "below" refers to the −Z direction. For example, the backlight 50 is disposed below the display panel 30, and light irradiated from the backlight 50 may be made incident on the lower plate surface of the display panel 30 and be emitted from an upper plate surface of the display panel 30.

The covers 10 and 20 may form the exterior of the display apparatus 1, and support the display panel 30 and the backlight 50 which are received therein. In FIG. 2, when it is assumed that the Z direction is an upper part or a front part with respect to the display panel 30 and the −Z direction is a lower part or a rear part with respect to the display panel 30, the covers 10 and 20 may include the front cover 10 that supports the front part of the display panel 30, and the rear cover 20 that supports the rear part of the backlight 50. The front cover 10 may have an opening that exposes outside an image display region of the display panel 30, on a plate surface parallel to the X-Y plane.

The display panel 30 is provided in a liquid crystal configuration, and displays an image on the plate surface in such a manner that a liquid crystal layer (not shown) is filled between two substrates (not shown) and the arrangement of the liquid crystal layer (not shown) is adjusted according to driving signals applied thereto. The display panel 30 does not spontaneously emit light and may receive light from the backlight 50 in order to display an image on the image display region on the plate surface.

The panel driver 40 may apply driving signals for driving the liquid crystal layer (not shown) to the display panel 30. The panel driver 40 may include a gate driving integrated circuit (IC) 41, a data chip film package 43, and a printed circuit board 45.

The gate driving IC 41 may be integrally formed on a substrate (not shown) of the display panel 30, and connected to each gate line (not shown) of the display panel 30.

The data chip film package 43 may be connected to each data line (not shown) formed in the display panel 30. Here, the data chip film package 43 may include a tape automated bonding (TAB) tape in which a semiconductor chip is joined to a wiring pattern formed on a base film by TAB technology. For example, in such a chip film package, a tape carrier package (TCP) or a chip on film (COF) may be used.

The printed circuit board 45 may provide gate driving signals to the gate driving IC 41 and provide data driving signals to the data chip film package 43.

The panel driver 40 having such a configuration may provide driving signals to each gate line (not shown) and each data line (not shown) of the display panel 30, thereby driving the liquid crystal layer (not shown) in units of pixels.

The backlight 50 may be disposed below the display panel 30, that is, in the −Z direction of the display panel 30 in order to supply light to the lower plate surface of the display panel 30. The backlight 50 may include a light source module 51 that is disposed in an edge area of the display panel 30, a light guide plate 53 that is disposed parallel to the display panel 30 to face the lower plate surface of the display panel 30, a reflection plate 55 that is disposed below the light guide plate 53 to face a lower plate surface of the light guide plate 53, and one or more optical sheets 57 that are interposed between the display panel 30 and the light guide plate 53.

In FIG. 2, the configuration of an edge type backlight 50 which is arranged along edges of the light source module 51 and the light guide plate 53, and in which a light irradiation direction of the light source module 51 and a light emission direction of the light guide plate 53 cross each other is illustrated. However, an implementation configuration of the backlight 50 is not limited to the exemplary embodiment disclosed in FIG. 2, and a change in the configuration of the backlight 50 is variously possible. For example, the backlight 50 may be implemented as a direct type backlight in which the light source module 51 is disposed below the light guide plate 53 and the light irradiation direction of the light source module 51 and the light emission direction of the light guide plate 53 are parallel to each other.

The light source module 51 may generate and irradiate light to make the irradiated light incident into the light guide plate 53. The light source module 51 is provided so that the light source module 51 may stand up to the plate surface of the display panel 30, that is, the X-Y plane, and is disposed along at least one of four direction edges of the display panel 30 or the light guide plate 53. The light source module 51 is implemented in such a manner that a light emitting device (not shown) implemented as a light emitting diode (LED) or the like is sequentially arranged on a module substrate (not shown) that extends in the X-direction.

The light guide plate 53 is a plastic lens that is implemented by an acrylic injection mold or the like, and guides the light made incident from the light source module 51 uniformly over the whole image display region of the display panel 30. The plate surface of the −Z direction of the light guide plate 53, that is, the lower plate surface may face the reflection plate 55, and side walls of the light guide plate 53 of the Y direction and the −Y direction among four side walls of four directions of the light guide plate 53 formed between the upper plate surface and the lower plate surface may face the light source module 51. The irradiated light from the light source module 51 is made incident to the side walls of the Y direction and the −Y direction of such a light guide plate 53.

In the light guide plate 53, a variety of optical patterns (not shown) that diffusively reflect light propagated inside the light guide plate 53 or convert an advancing direction of light are formed on the lower plate surface of the light guide plate 53, and therefore it is possible to make the distribution of light emitted from the light guide plate 53 uniform. Here, "advancing direction of light" denotes a direction in which the light is moving. For example, an advancing direction of light from a backlight would be a direction of irradiation of the light away from the backlight.

The reflection plate 55 reflects light coming out from the inside of the light guide plate 53 to the outside on a lower side of the light guide plate 53, so that the light is made incident into the light guide plate 53 again. The reflection plate 55 reflects light that is not reflected by an optical pattern formed on the lower plate surface of the light guide plate 53, into the light guide plate 53 again. For this, the upper plate surface of the reflection plate 55 has total reflection characteristics.

The one or more optical sheets 57 are laminated on the light guide plate 53 to adjust optical characteristics of light emitted from the light guide plate 53. The one or more optical sheets 57 may include a diffusion sheet, a prism sheet, a protection sheet, a dual brightness enhancement film (DBEF) sheet, and the like, and at least two kinds of sheets may be combined and laminated considering final results of the optical characteristics to be adjusted.

Hereinafter, a specific configuration of a display panel 100 of a display apparatus according to an exemplary embodiment will be described with reference to FIG. 3. A configuration of the display panel 100 which will be described below is merely one example, and is not limited in implementing the technical concept of the display apparatus.

Figure 3:
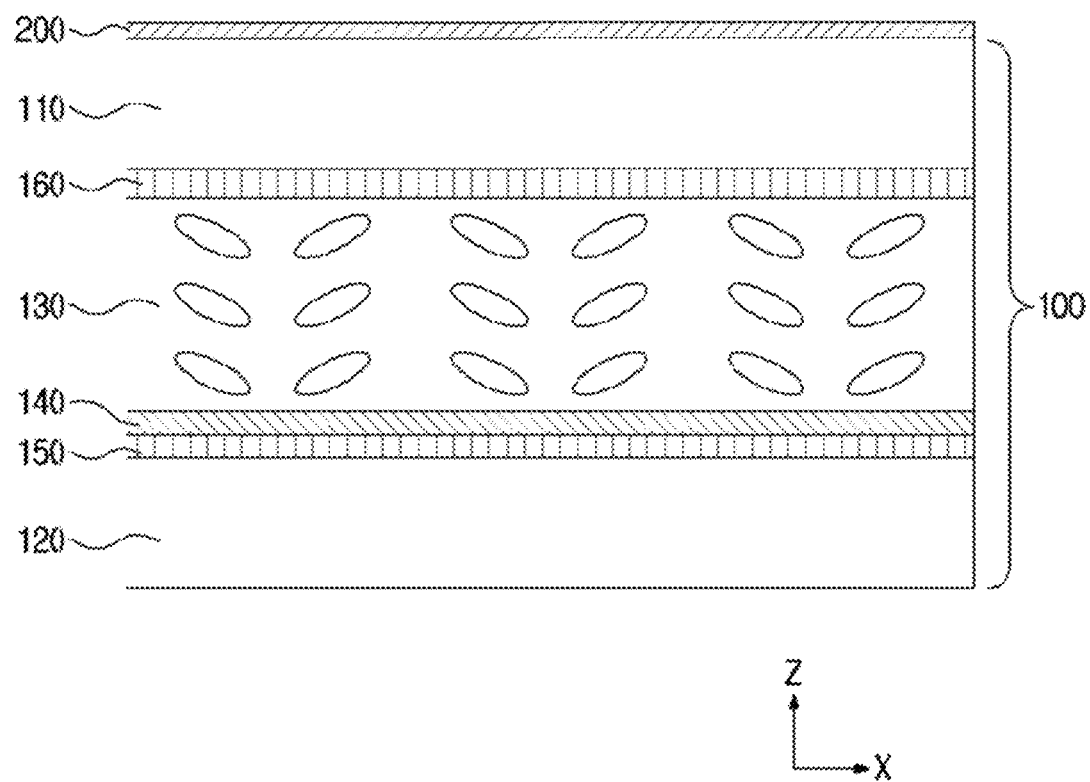
FIG. 3 is a cross-sectional view showing a lamination form of each component of a display panel.

FIG. 3 is a cross-sectional view showing a lamination form of each component of a display panel. The display panel 100 shown in FIG. 3 may have substantially the same configuration as that of the display panel 30 of FIGS. 1 and 2, and may be applied to the display apparatus 1 of FIG. 1.

As shown in FIG. 3, light that is irradiated in the Z direction from the backlight 50 (see FIG. 2) is made incident to the display panel 100, passes through various components constituting the display panel 100, and is emitted in the Z direction. It should be noted that expressions of upper portion/upper side and lower portion/lower side in the following descriptions are used for indicating relative arrangement or lamination relationship along the Z direction that is an advancing direction of irradiated light.

The display panel 100 may include an upper substrate 110, a lower substrate 120 that is disposed to face the upper substrate 110, a liquid crystal layer 130 that is filled between the upper substrate 110 and the lower substrate 120, a color filter layer 140 that is interposed between the liquid crystal layer 130 and the lower substrate 120, a lower polarization layer 150 that is laminated on an upper side of the lower substrate 120, and an upper polarization layer 160 that is laminated on a lower side of the upper substrate 110.

Hereinafter, each component of the display panel 100 will be described in detail.

The upper substrate 110 and the lower substrate 120 are transparent substrates which are arranged facing each other at an interval in an advancing direction of light. The upper substrate 110 and the lower substrate 120 may be implemented as a substrate made of a glass material or a plastic material, and when a plastic substrate is applied, a material such as polycarbonate, polyimide (PI), polyethersulfone (PES), polyacrylate (PAR), polyethylenenaphthalate (PEN), polyethyleneterephthalate (PET), or the like may be used.

The upper substrate 110 and the lower substrate 120 may have different characteristics according to a driving method of the liquid crystal layer 130. For example, when the driving method of the liquid crystal layer 130 is a passive matrix method, soda lime glass may be used, and when the driving method thereof is an active matrix method, alkali free glass and borosilicate glass may be used.

The liquid crystal layer 130 is positioned between the upper substrate 110 and the lower substrate 120, and adjusts the transmission of light in such a manner that arrangement of a liquid crystal is changed according to driving signals that are applied to the liquid crystal layer 130. A normal liquid does not have regularity in the direction and arrangement of molecules, but a liquid crystal is similar to a liquid phase having a certain degree of regularity. For example, there is a solid that becomes a liquid phase indicating anisotropy such as double refractiveness when the solid is heated and melted. The liquid crystal has optical characteristics such as double refractiveness or a color change. Since regularity is the nature of a crystal and the phase of a material is similar to a liquid, a material having the two properties is called a liquid crystal. When a voltage is applied to such a liquid crystal, the arrangement of molecules is changed, and therefore the optical characteristics are changed.

The liquid crystal of the liquid crystal layer 130 may be classified into a nematic liquid crystal, a cholesteric liquid crystal, a smectic liquid crystal, and a ferroelectric liquid crystal according to the arrangement of molecules.

The color filter layer 140 is interposed between the liquid crystal layer 130 and the lower substrate 120, and filters incident light with respect to each pixel of the liquid crystal layer 130 so that light of a certain color can be emitted. The color may be predetermined.

The color filter layer 140 converts light made incident to the display panel 100 into a RGB color to transmit the RGB color to the liquid crystal layer 130. Pixels of the liquid crystal layer 130 include sub pixels corresponding to each RGB color, and the color filter layer 140 performs filtering for each color with respect to each sub pixel. Thus, when light passes through each sub pixel, a color of light different for each sub pixel are emitted by the color filter layer 140. In the present exemplary embodiment, a case in which the color filter layer 140 is disposed on a side of the lower substrate 120 has been described, but the disposition of the color filter layer 140 is not limited thereto. For example, the color filter layer 140 may be disposed on a side of the upper substrate 10.

The lower polarization layer 150 is formed between the lower substrate 120 and the color filter layer 140, and the upper polarization layer 160 is formed between the upper substrate 110 and the liquid crystal layer 130. The lower polarization layer 150 and the upper polarization layer 160 are provided so as to transmit light of a certain polarization direction out of incident light. The polarization direction may be predetermined. The polarization direction of the light transmitted through each of the lower polarization layer 150 and the upper polarization layer 160 may be the same or different.

In addition, in FIG. 3, a case in which the upper polarization layer 160 and the lower polarization layer 150 are respectively formed on an upper side and a lower side of the liquid crystal layer 130 within the upper substrate 110 and the lower substrate 120 is shown. However, in some exemplary embodiments, only one of the lower polarization layer 150 and the upper polarization layer 160 may be installed. Moreover, in some exemplary embodiments, the polarization layers 150 and 160 may be laminated on the lower side of the lower substrate 120 rather than between the upper substrate 110 and the lower substrate 120. However, according to the exemplary embodiment of the display panel disclosed in FIG. 3, the polarization layers 150 and 160 are not laminated or formed on the upper side of the upper substrate 110.

Meanwhile, as shown in FIG. 3, a polarization film 200 may be adhered to an upper plate surface of the display panel 100. The polarization film 200 adhered in this manner may provide a display image to a user by transmitting light generated from the display panel 100 and project a mirror image by reflecting a part of external light that is incident on the polarization film 200.

In the related art, in order to add a mirror function to the display apparatus, a glass may be mounted to the upper plate surface of the display panel 100. The upper surface of the glass mounted in this manner is coated with a metal such as aluminum (Al), chrome (Cr), titanium (Ti), or the like, and the external light is reflected on the metal coating, and therefore the mirror image may be projected.

This method is referred to as a half mirror method. The term half mirror method is used because about 50% of light made incident into the glass from the outside is reflected and the remaining 50% is transmitted.

When employing the half mirror method, about 50% of the light generated from the display panel 100 is also reflected by the glass, and therefore the brightness of the image generated by the display panel 100 and provided to the user may be significantly reduced.

In addition, an increase in manufacturing costs due to the use of the glass is caused, and the quality of the mirror image is highly likely to be reduced due to poor uniformity of the metal coating.

In order to address these disadvantages with the related art, the polarization film 200 may be adhered to the display panel 100. Hereinafter, the operation of the polarization film 200 will be described with reference to FIGS. 4 to 6.

Figure 4:
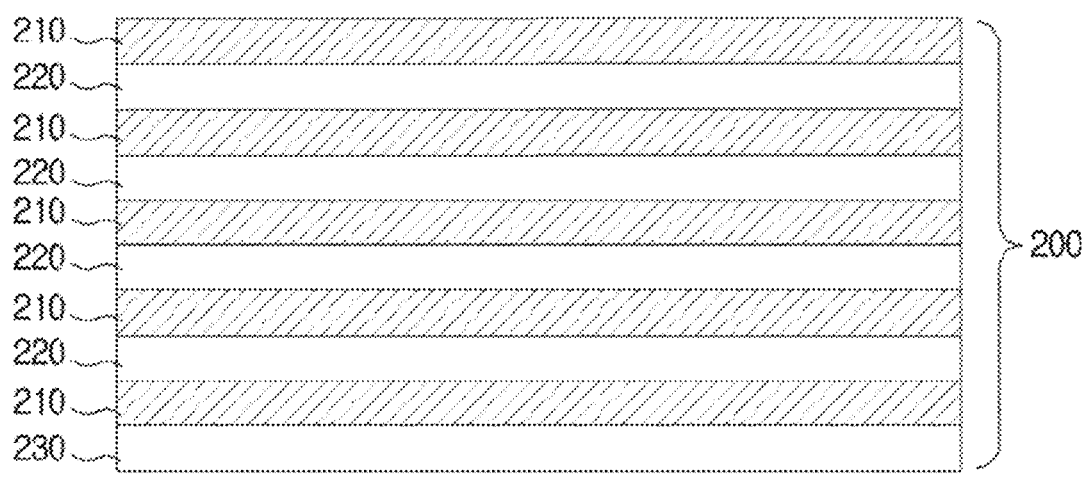
FIG. 4 is a cross-sectional view showing a polarization film according to an exemplary embodiment.

FIG. 4 is a cross-sectional view showing a polarization film according to an exemplary embodiment.

The polarization film 200 according to an exemplary embodiment may be formed by laminating a first polarization layer 210 having a first refractive index with respect to a first polarization and a second refractive index with respect to a second polarization, and a second polarization layer 220 having a second refractive index with respect to the first polarization and the second refractive index with respect to the second polarization.

Here, the first polarization and the second polarization may be perpendicular to each other. For example, when the first polarization is vertical polarization, the second polarization may be horizontal polarization. In contrast, when the first polarization is horizontal polarization, the second polarization may be vertical polarization. However, these are only examples, and the polarization may be any angle polarization. Thus, the first polarization may be a 45 degree polarization and the second polarization may be a 135 degree polarization, or a −45 degree polarization.

The first polarization layer 210 has a different refractive index with the first polarization and the second polarization, and thereby may be made of a birefringent material. For example, the first polarization layer 210 may be made of a polyester-based material having a high birefringence, and typically, polyethylenenaphthalate (PEN) or polyethyleneterephthalate (PET) may be used.

On the other hand, the second polarization layer 220 may be made of a material having the same refractive index with respect to the first polarization and the second polarization. For example, the second polarization layer 220 may be made of co-polyethylenenaphthalate (co-PEN).

The first polarization layer 210 and the second polarization layer 220 which are configured in this manner may be laminated in a certain direction. The direction may be predetermined. In FIG. 4, an example in which the first polarization layer 210 and the second polarization layer 220 are laminated in the Z-axis direction so as to cover the upper plate surface of the display panel 100 is shown.

The polarization film 200 may be obtained by alternately laminating the first polarization layer 210 and the second polarization layer 220. That is, the polarization film 200 may be manufactured in such a manner that, when the first polarization layer 210 is laminated, the second polarization layer 220 is laminated on an upper surface of the laminated first polarization layer 210, and the first polarization layer 210 is laminated on an upper surface of the second polarization layer 220 again. As a result, the polarization film 200 may employ a structure in which the second polarization layer 220 is arranged in each interval between a plurality of first polarization layers 210. In other words, the first polarization layers 210 and the second polarization layers 220 may be interleaved so as to alternate. Thus, the polarization film 200 may include the plurality of first polarization layers 210 and a plurality of second polarization layers 220, and have a structure in which several tens or several hundreds of layers are laminated.

In this instance, a thickness of each of the plurality of first polarization layers 210 may be all the same. In addition, a thickness of each of the plurality of second polarization layers 220 may be all the same. In particular, the thickness of each of the plurality of first polarization layers 210 may determine color coordinates of reflected first polarization, which will be described later.

In addition, on one surface of the polarization film 200, an adhesive layer 230 that can be adhered to one surface of the display panel 100, specifically, an upper plate surface thereof may be formed. The adhesive layer 230 may be formed by applying an adhesive composition to one surface of the polarization film 200.

The adhesive layer 230 may be formed by coating one surface of the polarization film 200 with the adhesive composition.

The adhesive composition used for forming the adhesive layer 230 may include at least one adhesive selected from an adhesive resin, and may further include a curing agent. As the adhesive, an ultraviolet (UV) curing adhesive or a thermosetting adhesive may be used, and as the curing agent, at least one selected from isocyanate-based and epoxy-based curing agents may be used.

Figure 5A:
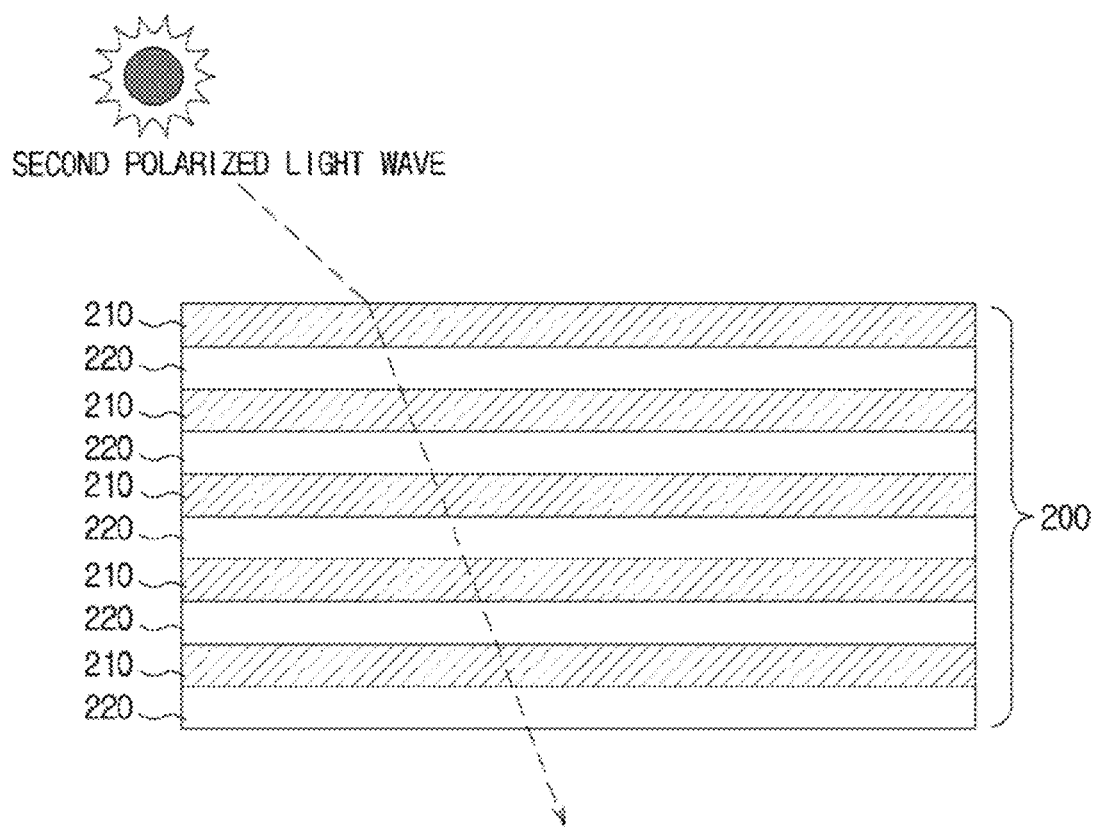
Figure 5B:
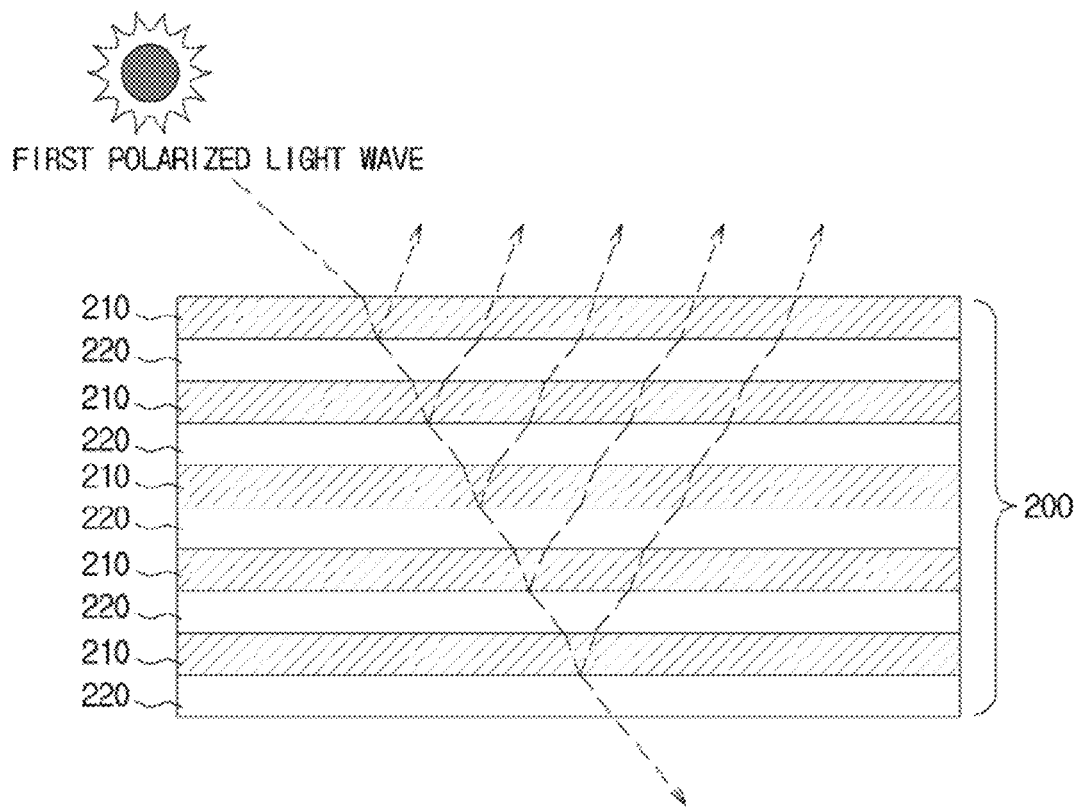

FIGS. 5A, 5B, and 6 are views for describing the optical property of a polarization film according to an exemplary embodiment.

FIGS. 5A and 5B illustrate a case in which external light is made incident according to an exemplary embodiment. Here, the external light may refer to visible light, and include vertical polarization and horizontal polarization. In addition, hereinafter, it is assumed that one of the vertical polarization and the horizontal polarization is first polarization, and the other one is second polarization.

Specifically, FIG. 5A illustrates a path in which the second polarization out of the external light is made incident, and FIG. 5B illustrates a path in which the first polarization out of the external light is made incident.

As described above, the first polarization layer 210 and the second polarization layer 220 have the same refractive index, that is, the second refractive index with respect to the second polarization. When considering characteristics in which reflection of light occurs in a boundary between media having different refractive indexes, reflection of the second polarization does not occur in a boundary between the first polarization layer 210 and the second polarization layer 220.

As a result, as shown in FIG. 5A, light of the second polarization made incident to one surface of the polarization film 200 may be emitted to the other surface of the polarization film 200. That is, the polarization film 200 may transmit the second polarization.

On the other hand, the first polarization layer 210 may have the first refractive index with respect to the first polarization, and the second polarization layer 220 may have the second refractive index with respect to the first polarization. As a result, reflection of the first polarization may occur in the boundary between the first polarization layer 210 and the second polarization layer 220.

Referring to FIG. 5B, it can be seen that light of the first polarization made incident to the polarization film 200 is reflected at the boundary between the first polarization layer 210 and the second polarization layer 220.

However, as shown in FIG. 5B, light of the first polarization made incident to the polarization film 200 is not all reflected at the boundary between the first polarization layer 210 and the second polarization layer 220. That is, a part of the light of the first polarization is absorbed in the first polarization layer 210 or the second polarization layer 220, and a part thereof may be transmitted through the first polarization layer 210 or the second polarization layer 220.

Thus, reflectance of the first polarization of the polarization film 200 may be increased along with an increase in the number of layers constituting the polarization film 200.

In addition, a thickness of each of the plurality of first polarization layers 210 may be the same, thereby suppressing occurrence of diffused reflection.

As described with reference to FIG. 5B, the polarization film 200 may reflect light of the first polarization. Thus, the polarization film 200 may project a mirror image of an object that faces an incident surface of the first polarization.

The case in which external light is made incident on the polarization film 200 has been described so far. Hereinafter, a case in which internal light of a display apparatus is made incident will be described.

FIG. 6 illustrates a case in which internal light of a display apparatus according to an exemplary embodiment is made incident into the polarization film 200.

As shown in FIG. 6, when the display panel 100 employs the structure of a liquid crystal display panel, light provided from a backlight to the display panel 100 may pass through the lower polarization layer 150 and the upper polarization layer 160 (see FIG. 3). In this instance, the lower polarization layer 150 and the upper polarization layer 160 allow only light in a certain polarization direction out of the provided light to transmit, and therefore light emitted from the upper plate surface of the display panel 100 may be polarization in one direction. The polarization direction may be predetermined.

Hereinafter, it is assumed that the display panel 100 displays an image constituted of light of the second polarization through the upper plate surface thereof.

Thus, light of the second polarization emitted from the upper plate surface of the display panel 100 may be made incident into the polarization film 200.

As described above, the first polarization layer 210 and the second polarization layer 220 have the same refractive index with respect to the second polarization. As shown in FIG. 6, the light of the second polarization provided by the display panel 100 may be transmitted through the polarization film 200.

In this manner, the polarization film 200 may allow light of the second polarization emitted from the display panel 100 to transmit, and therefore a user may receive the same image as the image provided from the display panel 100 before the polarization film 200 is adhered.

Figure 7A:
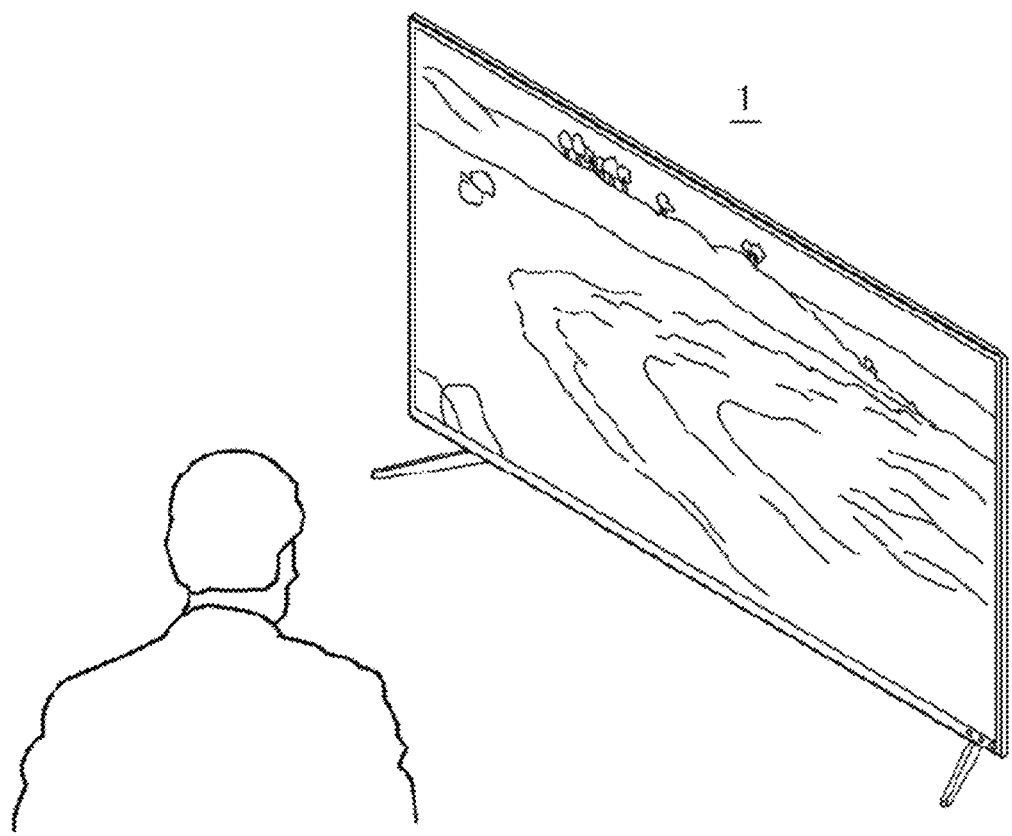
FIGS. 7A and 7B are views for describing operations at a time of ON and OFF of a power supply of a display apparatus according to an exemplary embodiment.
Figure 7B:
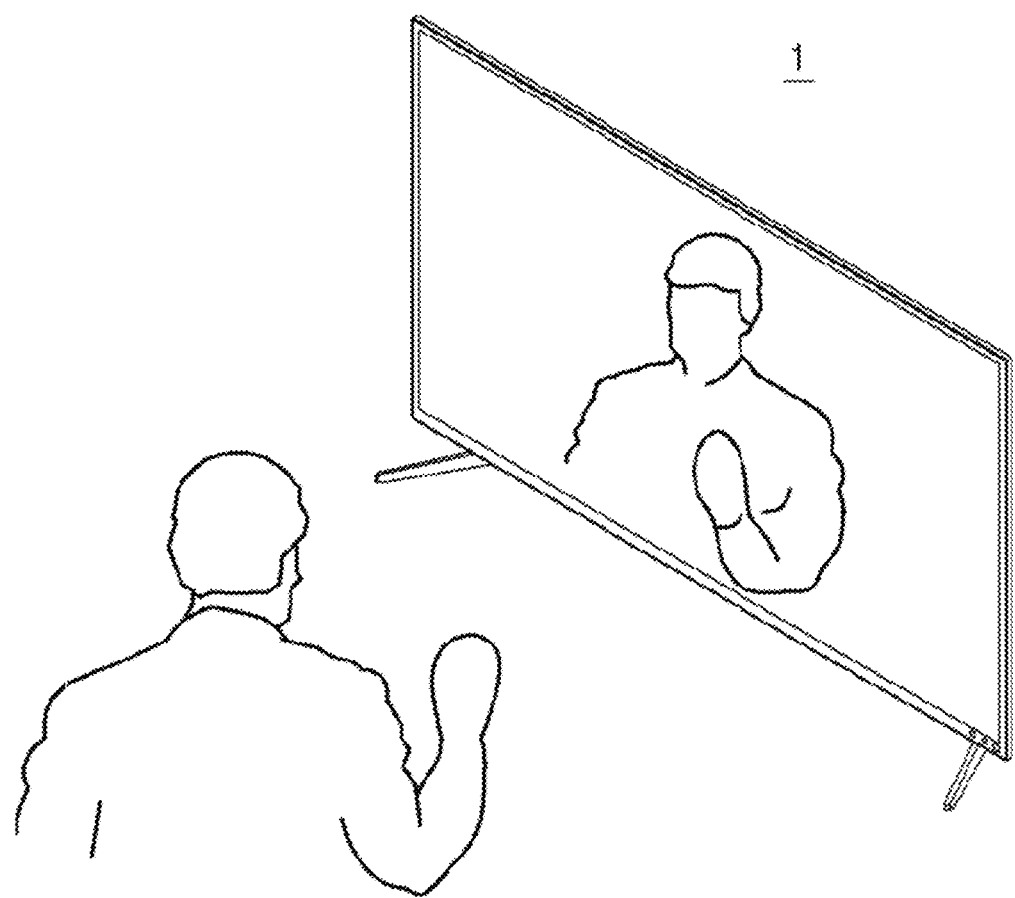

FIGS. 7A and 7B are views for describing operations at the time of ON and OFF of a power supply of a display apparatus according to an exemplary embodiment.

FIG. 7A illustrates a case in which the power supply of the display apparatus is turned on.

When the power supply of the display apparatus is turned on, the display panel 100 may display an image on an upper plate surface thereof. In this instance, the displayed image may be constituted of light of the second polarization.

As described in FIG. 6, the polarization film 200 may allow light of the second polarization emitted from the upper plate surface of the display panel 100 to transmit. The light of the second polarization transmitted through the polarization film 200 may be detected by a user.

In this manner, the user may detect the light of the second polarization transmitted through the polarization film 200, thereby recognizing the image displayed on the display panel 100.

In this instance, other than internal light of the display apparatus, external light may be made incident onto the polarization film 200. As described above, the polarization film 200 may reflect light of the first polarization out of the external light, which can be an obstacle for the user to recognize the image displayed on the display panel 100. However, luminance of the internal light generated from the backlight is higher than that of the external light, and therefore the influence of the external light in an ON state of the power supply may be insignificant.

FIG. 7B illustrates a case in which the power supply of the display apparatus is turned off.

When the power supply of the display apparatus is turned off, the display panel 100 may stop displaying the corresponding image. In this instance, only the external light provided from the outside may be considered.

As described in FIG. 5A, the polarization film 200 may allow light of the second polarization out of the external light to transmit. The light of the second polarization transmitted in this manner may enter into the display apparatus, and thereby is not detected by a user.

In addition, as described in FIG. 5B, the polarization film 200 may reflect light of the first polarization out of the external light. Specifically, the light of the first polarization is reflected from the boundary between the first polarization layer 210 and the second polarization layer 220 of the polarization film 200, and thereby may be detected by the user.

The light of the first polarization reflected in this manner may include information about an object located opposite to the incident surface of the polarization film 200. As a result, the polarization film 200 may reflect the light of the first polarization, thereby projecting a mirror image of the object located opposite to the incident surface.

Thus, the user may recognize the mirror image of the object.

In addition, the polarization film 200 may determine color coordinates of the reflected light of the first polarization. Specifically, the polarization film 200 may absorb the light of the first polarization of a specific frequency component and reflect the light of the first polarization from which the specific frequency component is removed, and thereby determine the frequency component ratio of the reflected light of the first polarization. The frequency component of light may directly refer to a color of light, and therefore color coordinates of the light may be also changed when the frequency component ratio is changed.

The frequency component of the light of the first polarization absorbed by the polarization film 200 may be determined according to a thickness of the first polarization layer 210.

Specifically, absorption of a long wave component of the light of the first polarization, that is, a low frequency component may be increased along with an increase in the thickness of the first polarization layer 210. As a result, the polarization film 200 may reflect the light of the first polarization in which the low frequency component is blocked, and the light of the first polarization may have color coordinates corresponding to the frequency component ratio in which the low frequency component is blocked.

On the other hand, a short wave component of the light of the first polarization may be absorbed, that is, a high frequency component may be increased along with a reduction in the thickness of the first polarization layer 210. As a result, the polarization film 200 may reflect the light of the first polarization in which the high frequency component is blocked, and the light of the first polarization may have color coordinates corresponding to the frequency component ratio in which the high frequency component is blocked.

Hereinafter, changes in color coordinates of the light of the first polarization that is reflected according to the thickness of the first polarization layer 210 when the power supply of the display apparatus is turned off will be described with reference to FIGS. 8 to 16.

In the description that follows, it is assumed that parameters of the polarization film 200 are based on the following Table 1.

TABLE 1

| | Refractive index with respect to first polarization | Refractive index with respect to second polarization | Birefringence |
| --- | --- | --- | --- |
| First polarization layer | 1.89 | 1.585 | 0.305 |
| Second polarization layer | 1.585 | 1.585 | 0.000 |

From Table 1, it can be seen that the first polarization layer 210 has a first refractive index of 1.89 with respect to first polarization and a second refractive index of 1.585 with respect to second polarization. In addition, the second polarization layer 220 has a second refractive index of 1.585 with respect to the first polarization, and the second refractive index of 1.585 with respect to the second polarization which is the same as the second refractive index of 1.585 with respect to the first polarization.

As a result, a birefringence that is defined by a difference between the refractive index with respect to the first polarization and the refractive index with respect to the second polarization may be 0.305 in a case of the first polarization layer 210, but may be "0" in a case of the second polarization layer 220.

Thus, hereinafter, it is assumed that the first polarization layer 210 is made of a birefringent material having a birefringence of 0.305 and the second polarization layer 220 is made of a material which is not the birefringent material, i.e., which has a birefringence of 0.

First, the polarization film 200 that is manufactured in such a manner that the first polarization has color coordinates corresponding to a red color will be described with reference to FIGS. 8 to 10.

Figure 8:
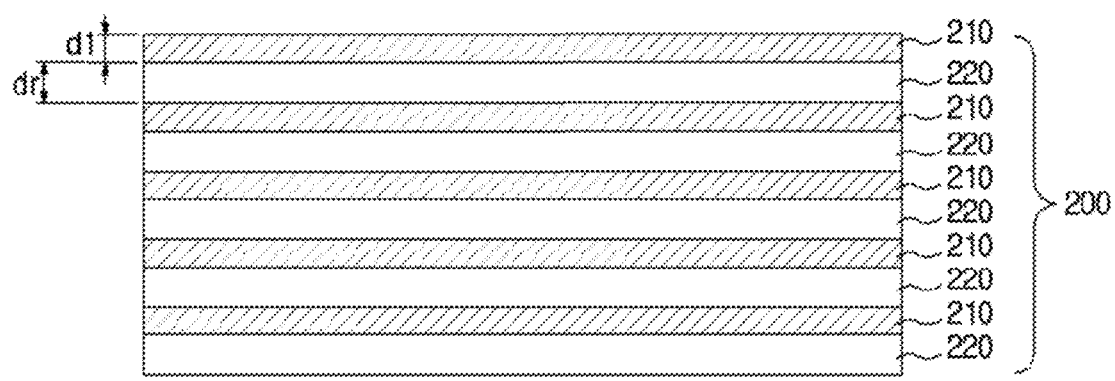
FIG. 8 is a cross-sectional view showing a first polarization layer of a polarization film that absorbs light having a high frequency component, according to an exemplary embodiment.
Figure 9:
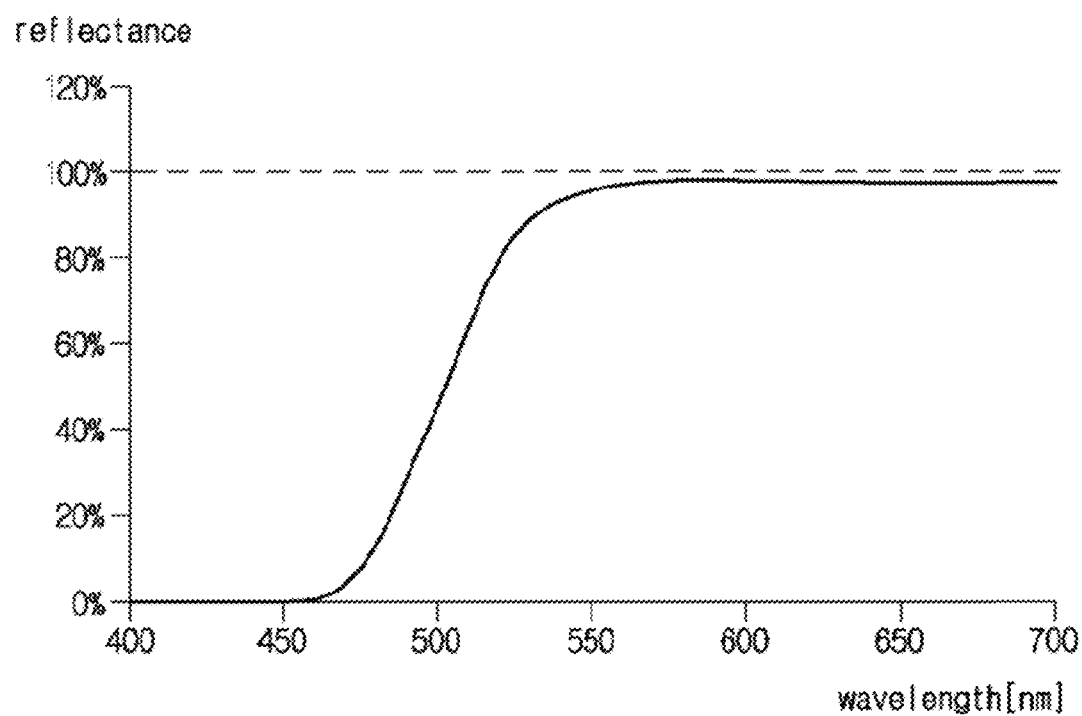
FIG. 9 is a graph showing reflectance of light of a first polarization of a polarization film according to an exemplary embodiment.
Figure 10:
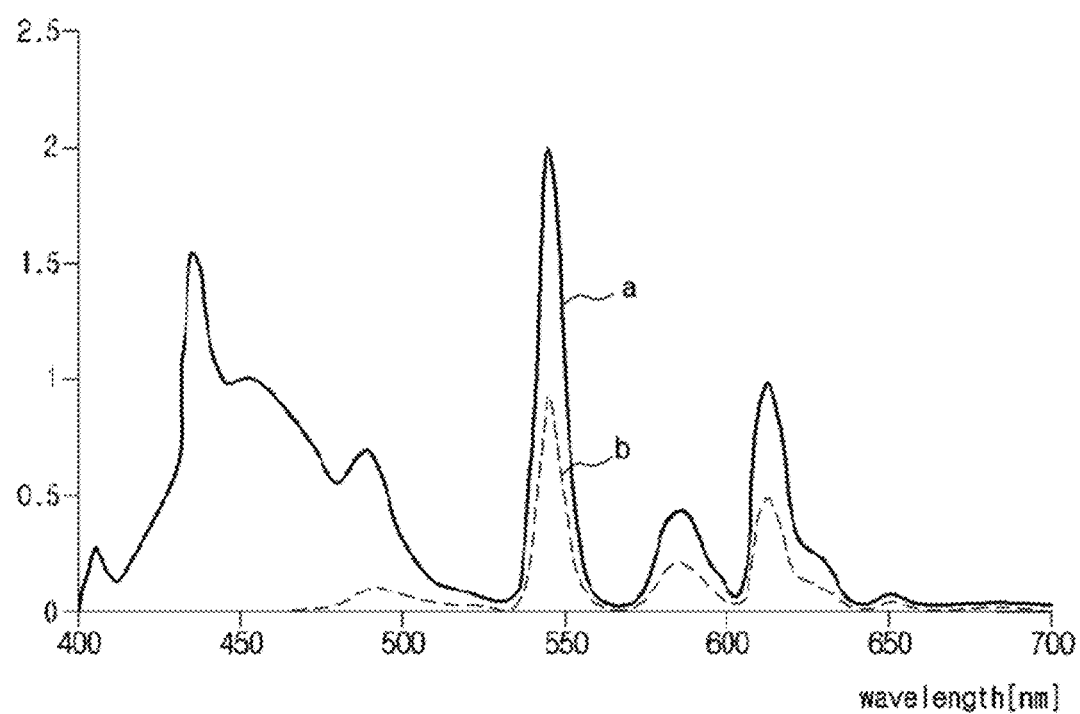
FIG. 10 is a view showing frequency spectra of incident light and reflected light of a polarization film according to an exemplary embodiment.

FIG. 8 is a cross-sectional view showing a first polarization layer of a polarization film that absorbs light having a high frequency component, according to an exemplary embodiment, FIG. 9 is a graph showing reflectance of light of a first polarization of a polarization film according to an exemplary embodiment, and FIG. 10 is a view showing frequency spectra of incident light and reflected light of a polarization film according to an exemplary embodiment.

As described above, color coordinates of the reflected light of the first polarization may be determined according to a thickness of the first polarization layer 210 of the polarization film 200. The absorption of the high frequency component of the light is increased as the thickness of the first polarization layer 210 is reduced, and therefore a cyan color corresponding to the high frequency component of the light may be removed from the reflected first polarization. The cyan color and red color complement each other, and therefore the reflected light of the first polarization may have color coordinates corresponding to the red color.

Referring to FIG. 8, the first polarization layer 210 of the polarization film 200 may be laminated to have a thickness $d_1$. In this instance, $d_1$ may refer to a thickness capable of absorbing a high frequency component of the light.

Here, the second polarization layer 220 may be laminated to have a thickness $d_r$. The thickness $d_r$ of the second polarization layer 220 is independent of the thickness of the first polarization layer 210, but for convenience, it is assumed that $d_1 < d_r$ is satisfied.

The polarization film 200 of FIG. 8 may be manufactured by alternately laminating the first polarization layer 210 having the thickness $d_1$ and the second polarization layer 220 having the thickness $d_r$.

The polarization film 200 manufactured in this manner may absorb a high frequency component out of light of the first polarization that is incident to the polarization film 200, that is, a short wave component. In other words, the polarization film 200 of FIG. 8 may reflect the remaining components except the short wave component out of the light of the first polarization that is incident to the polarization film 200.

The polarization film 200 of FIG. 8 may be based on a graph of reflectance of light of the first polarization shown in FIG. 9. In the graph of FIG. 9, an x-axis indicates a wavelength of the first polarization, and a y-axis indicates reflectance of the polarization film 200.

Referring to FIG. 9, it can be seen that reflectance of a short wave component out of light of the first polarization is lower than reflectance of a long wave component thereof. Specifically, it can be seen that the reflectance of light of the first polarization having a wavelength of 450 nm or less is 0%, whereas the reflectance of light of the first polarization having a wavelength of 550 nm or more is close to 100%.

Thus, the polarization film 200 of FIG. 8 may absorb all of the light of the first polarization having the wavelength of 450 nm or less without reflection, and may reflect most of the light of the first polarization having the wavelength of 550 nm or more.

Here, the wavelength of 450 nm or less may include light of purple, indigo, and cyan colors, and therefore the reflected light of the first polarization may show a color in which the purple, indigo, and cyan colors are removed.

Characteristics of the polarization film 200 of FIG. 8 may be confirmed once more through FIG. 10. FIG. 10 illustrates spectra of incident light and reflected light of the polarization film 200 of FIG. 8. In FIG. 10, an x-axis indicates a wavelength of light, and a y-axis indicates relative intensity. In addition, in FIG. 10, "a" indicates incident light and "b" indicates reflected light.

In this instance, the incident light may refer to visible light as the above-described external light, and include light of a first polarization and light of a second polarization. In addition, the reflected light may be light reflected from the polarization film 200 and thereby refer to light of the first polarization.

Referring to FIG. 10, it can be seen that the incident light "a" is distributed over the whole wavelength region. On the other hand, a long wave region of the reflected light "b" may have a similar form to the form of the incident light "a", but the reflected light "b" has a significant difference from the form of the incident light "a" as the wavelength of the reflected light becomes shorter.

This difference indicates that the polarization film 200 of FIG. 8 reflects light of the first polarization from which the short wave component is removed, by absorbing the short wave component out of light of the first polarization as shown in FIG. 9.

Meanwhile, referring to FIG. 10, the reason why there is a difference in the relative intensity of incident light "a" and the reflected light "b" in the long wave region is because light of the second polarization out of the incident light is transmitted through the polarization film 200, and a part of light of the first polarization out of the incident light is absorbed in the polarization film 200.

Color coordinates corresponding to the spectrum of the incident light may be (0.258, 0.228) on a chromaticity diagram. On the other hand, color coordinates corresponding to the spectrum of the reflected light may be (0.438, 0.518) on the chromaticity diagram.

These color coordinates indicate that, when external light is made incident into the polarization film 200, light of the first polarization having a red color, specifically, a color indicated by the color coordinates (0.438, 0.518) can be reflected. As a result, a user may receive a mirror image of a red color through the polarization film 200.

Next, a polarization film 200 that is manufactured in such a manner that the first polarization has color coordinates corresponding to a cyan color will be described with reference to FIGS. 11 to 13.

Figure 11:
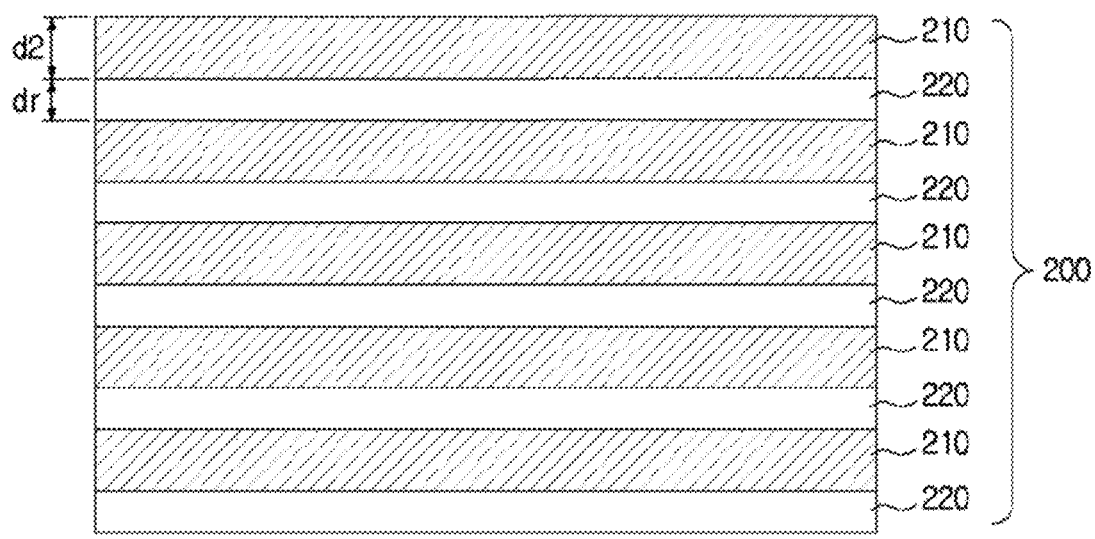
FIG. 11 is a cross-sectional view showing a first polarization layer of a polarization film that absorbs light having a low frequency component, according to another exemplary embodiment.
Figure 12:
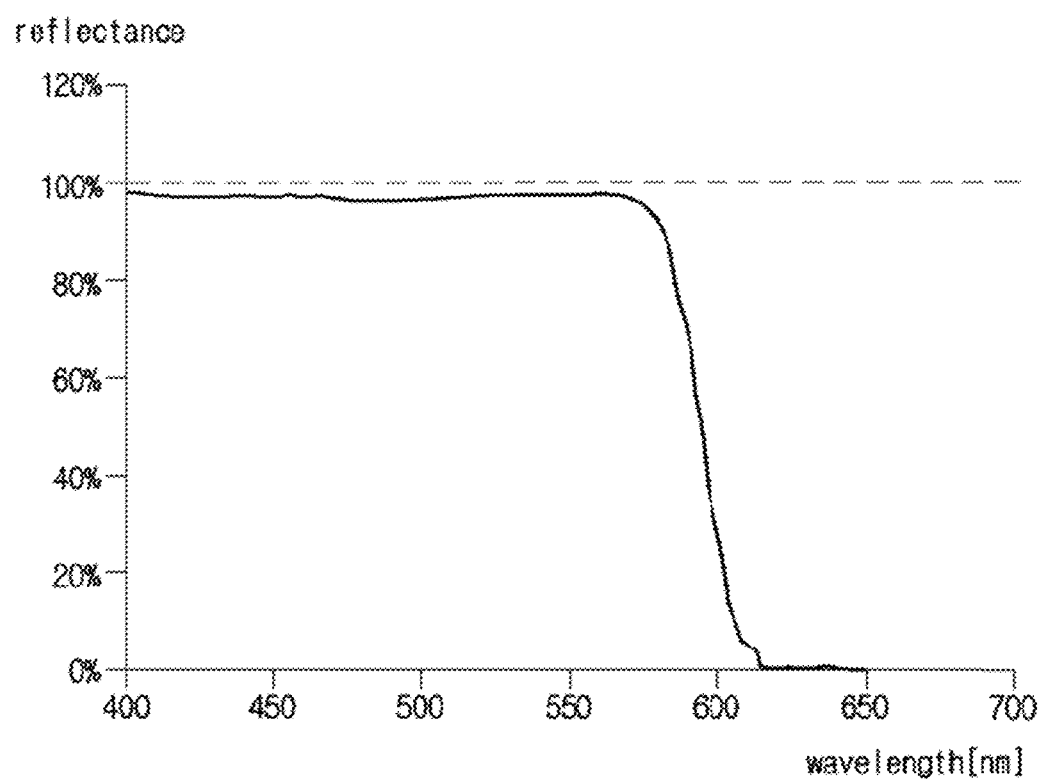
FIG. 12 is a graph showing reflectance of light of a first polarization of a polarization film according to another exemplary embodiment.
Figure 13:
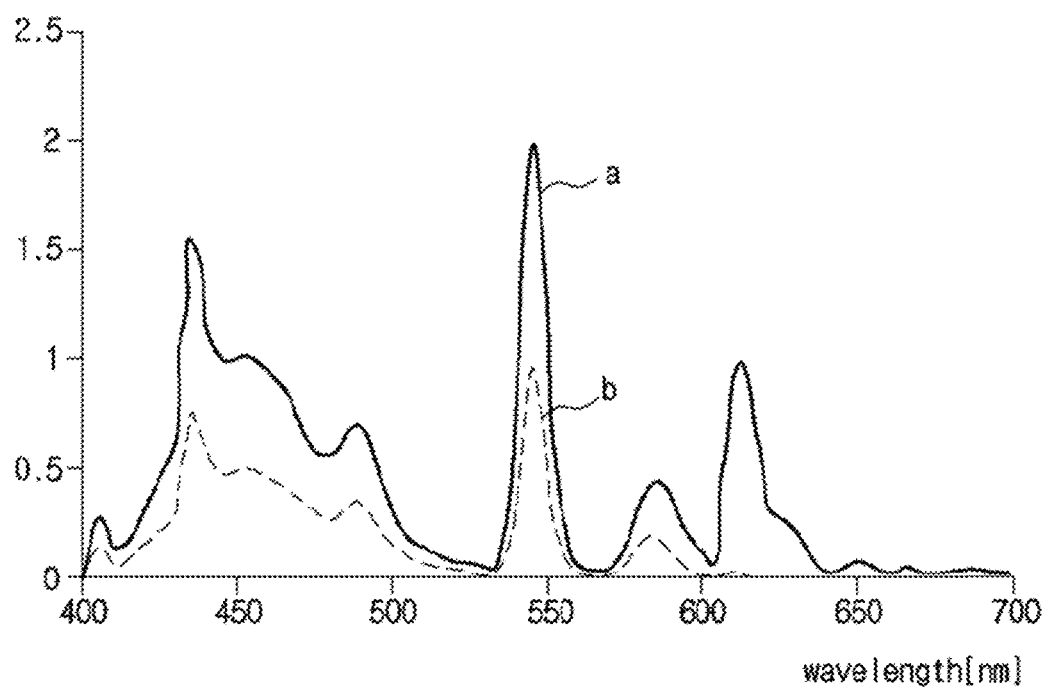
FIG. 13 is a view showing frequency spectra of incident light and reflected light of a polarization film according to another exemplary embodiment.

FIG. 11 is a cross-sectional view showing a first polarization layer of a polarization film that absorbs light having low frequency component, according to another exemplary embodiment, FIG. 12 is a graph showing reflectance of light of the first polarization of a polarization film, according to another exemplary embodiment, and FIG. 13 is a view showing frequency spectra of incident light and reflected light of a polarization film according another exemplary embodiment.

As described above with reference to FIGS. 8 to 10, by reducing the thickness of the first polarization layer 210, the reflected first polarization may have color coordinates corresponding to the red color. In contrast, as shown in FIGS. 11-13, by increasing the thickness of the first polarization layer 210, the reflected light of the first polarization may have color coordinates corresponding to the cyan color.

Specifically, absorption of the low frequency component of light may be increased as the thickness of the first polarization layer 210 is increased, and therefore the red color corresponding to the low frequency component may be removed from the reflected light of the first polarization. The red color and the cyan color complement each other, and therefore the reflected light of the first polarization may have color coordinates corresponding to the cyan color.

Referring to FIG. 11, the first polarization layer 210 of the polarization film 200 may be laminated to have a thickness $d_2$. In this instance, $d_2$ may refer to a thickness capable of absorbing light of the low frequency component.

The second polarization layer 220 of FIG. 11 may be laminated to have a thickness $d_r$, in the same manner as that in the second polarization layer 220 of FIG. 8, and it is assumed that $d_2 > d_r$ is satisfied.

The polarization film 200 of FIG. 11 may be manufactured by alternately laminating the first polarization layer 210 having the thickness $d_2$ and the second polarization layer 220 having the thickness $d_r$.

The polarization film 200 of FIG. 11 manufactured in this manner may absorb the low frequency component of the light, that is, the long wave component out of the light of the first polarization that is incident on the polarization film 200. Accordingly, the polarization film 200 of FIG. 11 may reflect the remaining components of the light except the long wave component out of the light of the first polarization that is incident on the polarization film 200.

The polarization film 200 of FIG. 11 may be based on a graph of reflectance of light of the first polarization of FIG. 12. In the graph of FIG. 12, an x-axis indicates a wavelength of the first polarization, and a y-axis indicates reflectance of the polarization film 200.

Referring to FIG. 12, it can be seen that reflectance of a long wave component of light out of light of the first polarization is lower than reflectance of a short wave component thereof, which may exhibit opposite characteristics of those of FIG. 9.

Specifically, it can be seen that the reflectance of light of the first polarization having a wavelength of 620 nm or more is 0%, whereas the reflectance of light of the first polarization having a wavelength of 580 nm or less is close to 100%.

Thus, the polarization film 200 of FIG. 11 may absorb all of the light of the first polarization having the wavelength of 620 nm or more without reflection, and reflect most of the light of the first polarization having the wavelength of 580 nm or less.

Here, the wavelength of 620 nm or more may include light of yellow, orange, and red colors, and therefore the reflected light of the first polarization may show a color in which the yellow, orange, and red colors are removed.

Characteristics of the polarization film 200 of FIG. 11 may be confirmed once more through FIG. 13. FIG. 13 illustrates spectra of incident light and reflected light. In FIG. 13, an x-axis indicates a wavelength of light, and a y-axis indicates relative intensity. In addition, in FIG. 13, "a" indicates incident light and "b" indicates reflected light.

In this instance, the incident light "a" may refer to visible light as the above-described external light, and include light of the first polarization and the second polarization. In addition, the reflected light "b" may be light reflected from the polarization film 200 and thereby refer to light of the first polarization.

Referring to FIG. 13, the incident light "a" is distributed over the whole wavelength region in the same manner as that in FIG. 10. This is because the incident light "a" is visible light.

On the other hand, in the reflected light "b", the relative intensity of a long wave region shows "0". Specifically, the reflected light "b" of a short wave region may have a similar form to that of the spectrum of the incident light "a", but the reflected light "b" in the long wave region of 620 nm or more does not exist unlike the incident light "a" whose relative intensity exists in the long wave region.

This difference indicates that the polarization film 200 of FIG. 11 reflects light of the first polarization from which the long wave component is removed, by absorbing the long wave component out of the light of the first polarization as seen in FIG. 12.

Meanwhile, in the similar manner to that in FIG. 10, the reason why there is a difference in the relative intensity of incident light "a" and reflected light "b" in the short wave region of FIG. 13 is because light of the second polarization out of the incident light "a" is transmitted through the polarization film 200, and a part of the light of the first polarization out of the incident light "a" is absorbed in the polarization film 200.

When located on a chromaticity diagram, color coordinates of the incident light "a" are (0.258, 0.228), whereas color coordinates corresponding to the spectrum of the reflected light "b" are (0.197, 0.212).

These color coordinates indicate that, when external light is made incident into the polarization film 200 of FIG. 11, light of the first polarization having a cyan color, specifically, a color indicated by the color coordinates (0.197, 0.212) can be reflected. As a result, a user may receive a mirror image of a cyan color through the polarization film 200.

Finally, the polarization film 200 that is manufactured in such a manner that the first polarization has color coordinates corresponding to a pink color will be described with reference to FIGS. 14 to 16.

Figure 14:
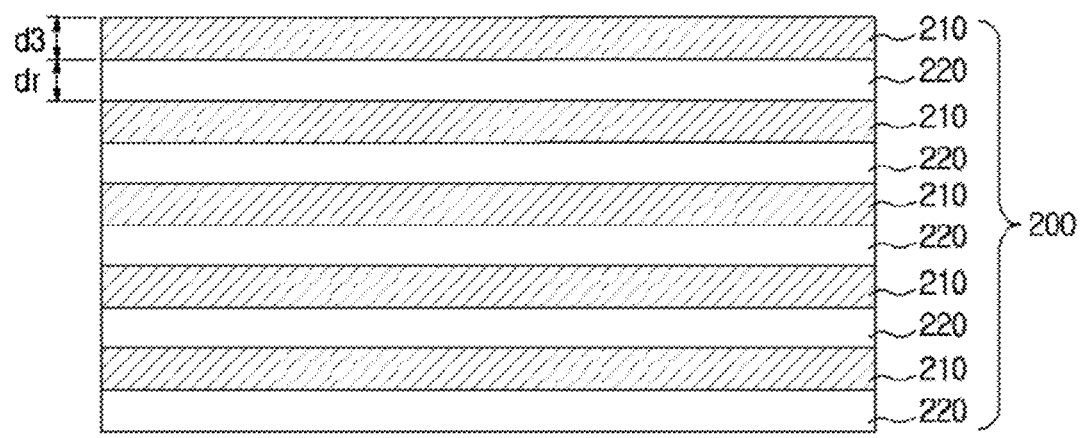
FIG. 14 is a cross-sectional view showing a first polarization layer that absorbs light having a frequency component corresponding to a green color of a polarization film according to still another exemplary embodiment.
Figure 15:
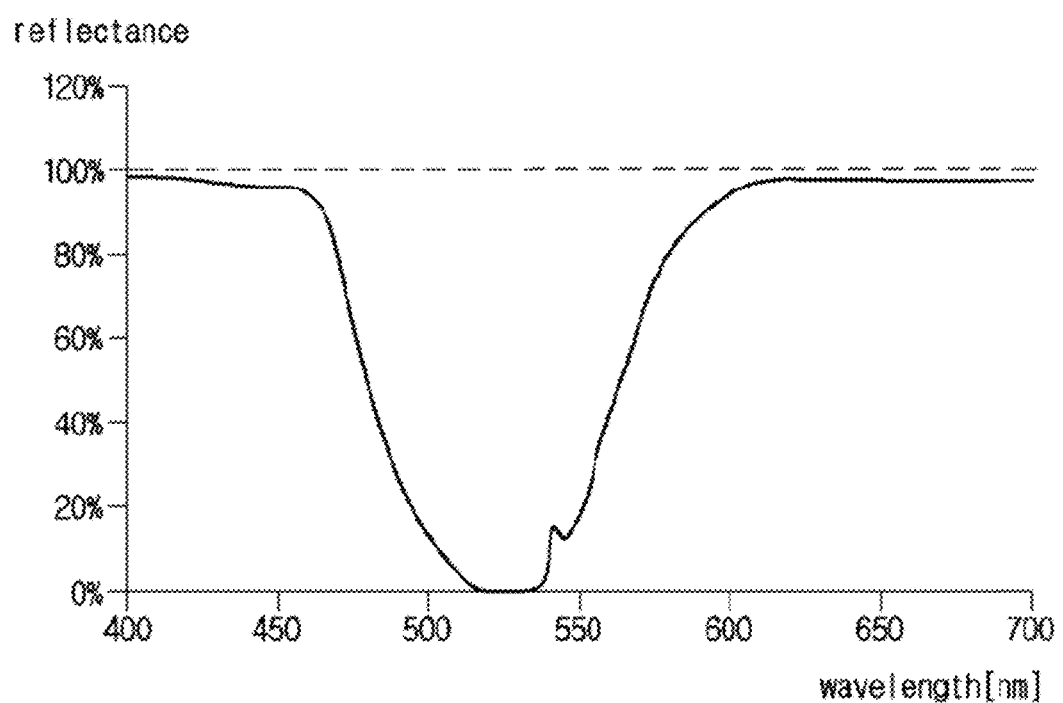
FIG. 15 is a graph showing reflectance of light of a first polarization of a polarization film according to still another exemplary embodiment.
Figure 16:
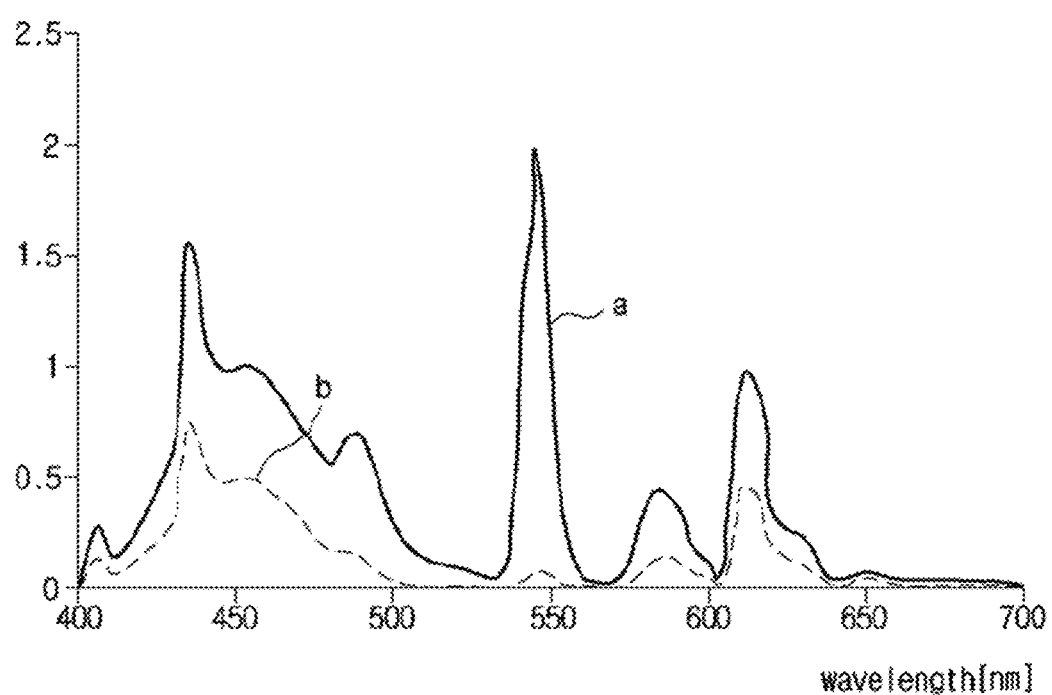
FIG. 16 is a view showing frequency spectra of incident light and reflected light of a polarization film according to still another exemplary embodiment.

FIG. 14 is a cross-sectional view showing a first polarization layer of a polarization film that absorbs light having a frequency component corresponding to a green color, according to still another exemplary embodiment, FIG. 15 is a graph showing reflectance of light of the first polarization of a polarization film according to still another exemplary embodiment, and FIG. 16 is a view showing frequency spectra of incident light and reflected light of a polarization film according to still another exemplary embodiment.

As described with reference to FIGS. 8 to 13, by adjusting a thickness of the first polarization layer 210, the reflected light of the first polarization may have color coordinates corresponding to the thickness of the first polarization layer 210. Thus, by adjusting the thickness of the first polarization layer 210, light of the first polarization may have color coordinates corresponding to a pink color.

Specifically, in order for the reflected light of the first polarization to show the pink color, the first polarization layer 210 may be laminated to have a thickness capable of absorbing light of the first polarization of a green color that is a complementary color of the pink color. That is, by laminating the first polarization layer 210 according to a thickness capable of absorbing light of the first polarization having a frequency component showing a green color, the reflected light of the first polarization may show the pink color.

Referring to FIG. 14, the first polarization layer 210 of the polarization film 200 may be laminated to have a thickness $d_3$. In this instance, $d_3$ may refer to a thickness capable of producing a polarization film capable of absorbing light having the frequency component corresponding to the green color.

The second polarization layer 220 of FIG. 14 may be laminated to have a thickness $d_r$ in the same manner as that of the second polarization layer 220 of FIGS. 8 and 11, and it is assumed that $d_3 = d_r$ is satisfied.

By alternately laminating the first polarization layer 210 having the thickness $d_3$ and the second polarization layer 220 having the thickness $d_r$, the polarization film 200 of FIG. 14 may be manufactured.

The polarization film 200 of FIG. 14 manufactured in this manner may absorb light having a frequency component of an intermediate band corresponding to the green color out of light of the first polarization that is incident on the polarization film 200. Thus, the polarization film 200 of FIG. 14 may reflect the remaining component of the light except for light having the frequency component corresponding to the green color out of light of the first polarization that is incident on the polarization film 200.

The polarization film 200 of FIG. 14 may be based on a graph of reflectance of light of the first polarization of FIG. 15. In the graph of FIG. 15, an x-axis indicates a wavelength of light of the first polarization, and a y-axis indicates reflectance of the polarization film 200.

Referring to FIG. 15, it can be seen that reflectance of light having the frequency component corresponding to the green color out of light of the first polarization, that is, reflectance in a region of 520 nm to 540 nm is lower than reflectance of light having the remaining frequency component.

Specifically, it can be seen that the reflectance of light of the first polarization having a wavelength of 520 nm to 540 nm is 0%, whereas the reflectance of light of the first polarization having a wavelength of 620 nm or more or 420 nm or less is close to 100%.

Thus, the polarization film 200 of FIG. 15 may absorb all of the light of the first polarization having the wavelength of 520 nm to 540 nm without reflection, and reflect most of the light of the first polarization having the wavelength of 620 nm or more or 420 nm or less.

As described above, the wavelength of 520 nm to 540 nm may include light of the green color, and therefore the reflected light of first polarization may show the pink color from which the green color is removed.

Characteristics of the polarization film 200 of FIG. 14 may be confirmed once more through FIG. 16. FIG. 16 illustrates spectra of incident light and reflected light. In FIG. 16, an x-axis indicates a wavelength of light, and a y-axis indicates relative intensity. In addition, in FIG. 16, "a" indicates incident light and "b" indicates reflected light.

In this instance, the incident light "a" may refer to visible light as the above-described external light, and include light of the first polarization and the second polarization. In addition, the reflected light "b" may be light reflected from the polarization film 200 and thereby refer to light of the first polarization.

Referring to FIG. 16, the incident light "a" is distributed over the whole wavelength region in the same manner as those in FIGS. 10 and 13. This is because the incident light "a" is visible light.

On the other hand, the relative intensity of light of the wavelength region of 520 nm to 540 nm shows "0". In addition, the reflected light "b" of the remaining wavelength region except the wavelength region of 520 nm to 540 nm has a similar form to that of the spectrum of the incident light "a".

Accordingly, the polarization film 200 of FIG. 14 may absorb light having the wavelength component of 520 nm to 540 nm out of light of the first polarization and thereby reflect the light of the first polarization from which the wavelength component of 520 nm to 540 nm is removed, as seen in FIG. 15.

Meanwhile, in the similar manner to those in FIGS. 10 and 13, the reason why there is a difference in the relative intensity of incident light "a" and reflected light "b" in the short wave region of FIG. 16 is because light of the second polarization out of the incident light is transmitted through the polarization film 200, and a part of light of the first polarization out of the incident light is absorbed in the polarization film 200.

When located on a chromaticity diagram, color coordinates of the incident light "a" of FIG. 16 are (0.258, 0.228), whereas color coordinates corresponding to the spectrum of the reflected light "b" are (0.260, 0.115).

Thus, when external light is made incident into the polarization film 200, light of the first polarization having the pink color, that is, a color indicated by the color coordinates (0.260, 0.115) can be reflected. As a result, a user may receive a mirror image of a pink color through the polarization film 200.

According to the polarization film 200 according to the various exemplary embodiments which have been described so far, the color of the projected mirror image may be determined according to a thickness of the first polarization layer 210.

Figure 17A:
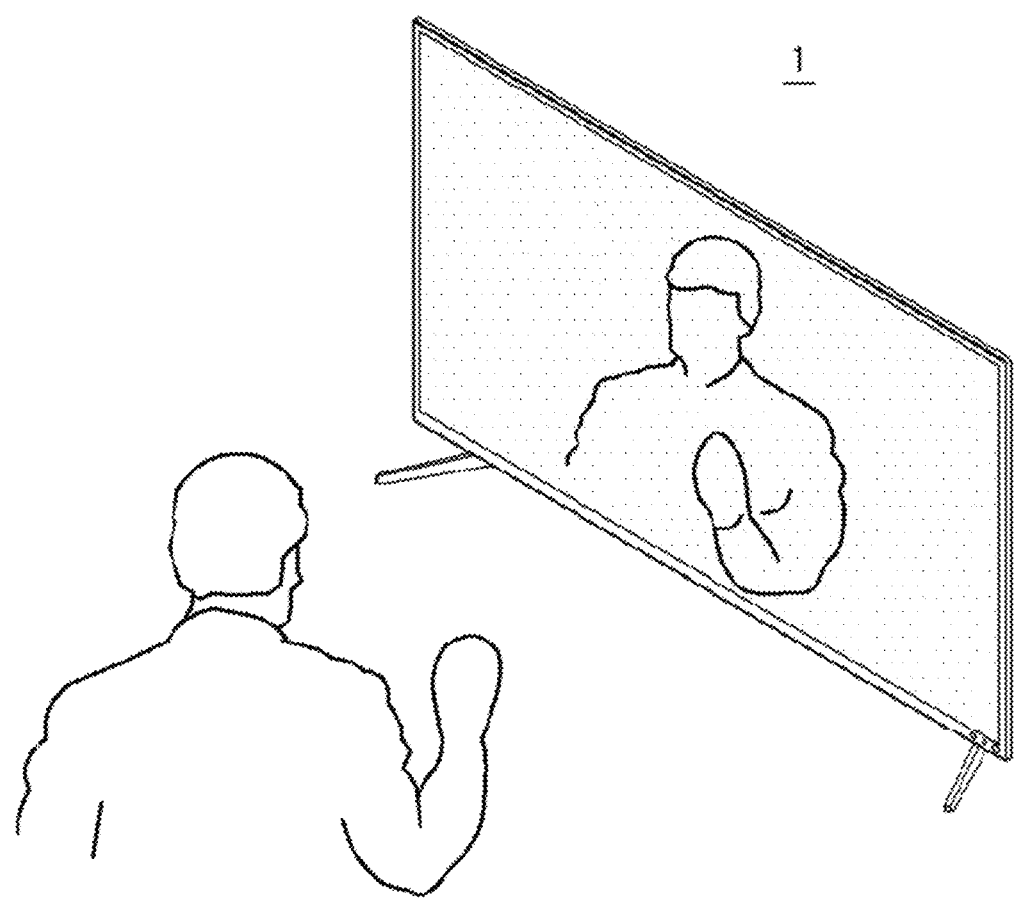
FIGS. 17A to 17C are views showing a change of a color of a mirror image according to a thickness of a first polarization layer.
Figure 17B:
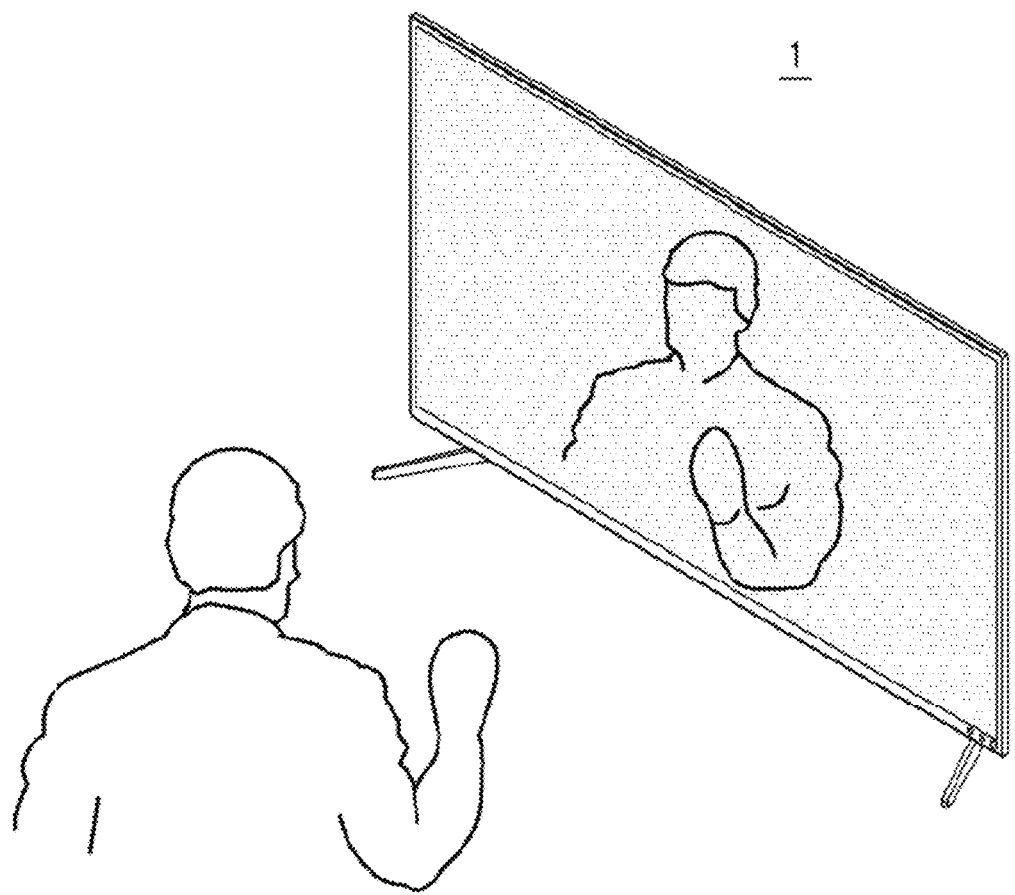
Figure 17C:
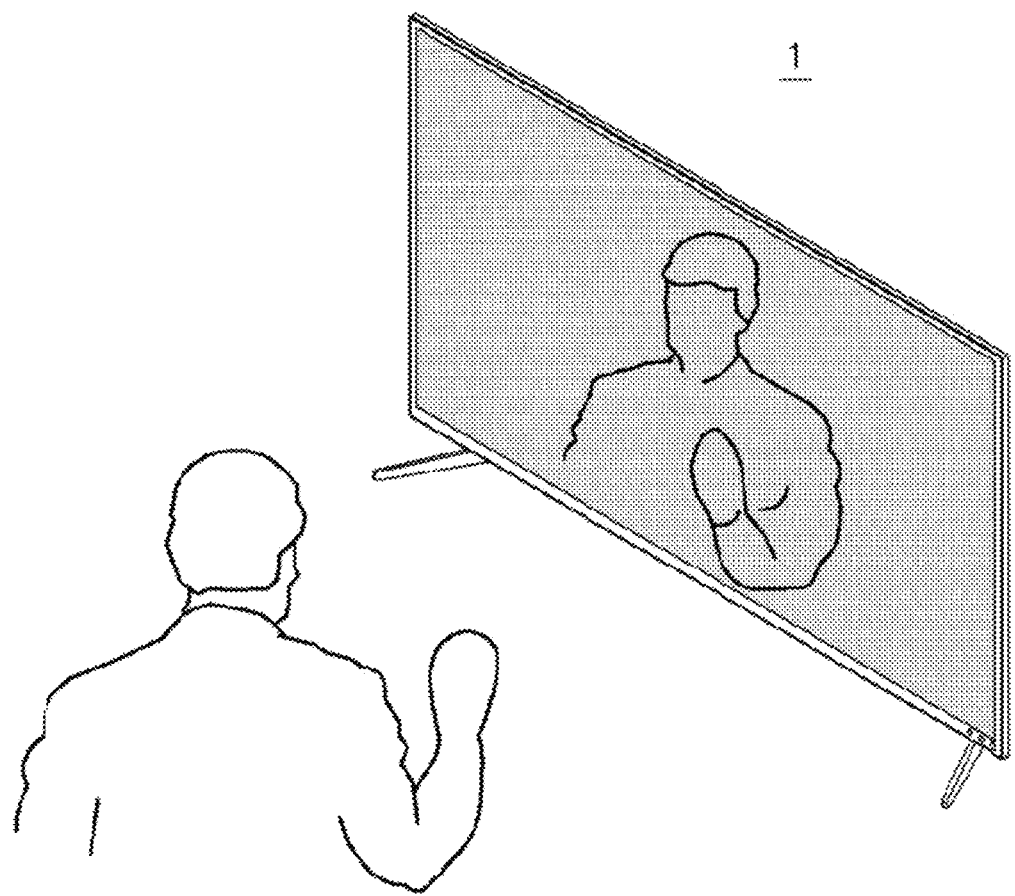

FIGS. 17A to 17C are views showing a change of a color of a mirror image according to a thickness of a first polarization layer. FIG. 17A illustrates a case in which the polarization film 200 of FIG. 8 is applied, FIG. 17B illustrates a case in which the polarization film 200 of FIG. 14 is applied, and FIG. 17C illustrates a case in which the polarization film 200 of FIG. 11 is applied.

Referring to FIG. 17A, when the thickness of the first polarization layer 210 is $d_1$, the display apparatus may project a mirror image of a red color to provide the projected mirror image to a user. Unlike this, referring to FIG. 17B, when the thickness of the first polarization layer 210 is $d_3$, the apparatus may project a mirror image of a pink color to provide the projected mirror image to a user. In addition, referring to FIG. 17C, when the thickness of the first polarization layer 210 is $d_2$, the apparatus may project a mirror image of a cyan color to provide the projected mirror image to a user.

In this manner, the thickness of the first polarization layer 210 is changed depending on the color of the mirror image to be provided, and therefore it is possible to manufacture the polarization film 200 that provides the mirror image of a certain color.

On the assumption that the power supply of the display apparatus is turned off, descriptions have been made so far. Hereinafter, operations of the polarization film 200 in a case in which the power supply of the display apparatus is turned on will be described with reference to FIG. 18.

Figure 18:
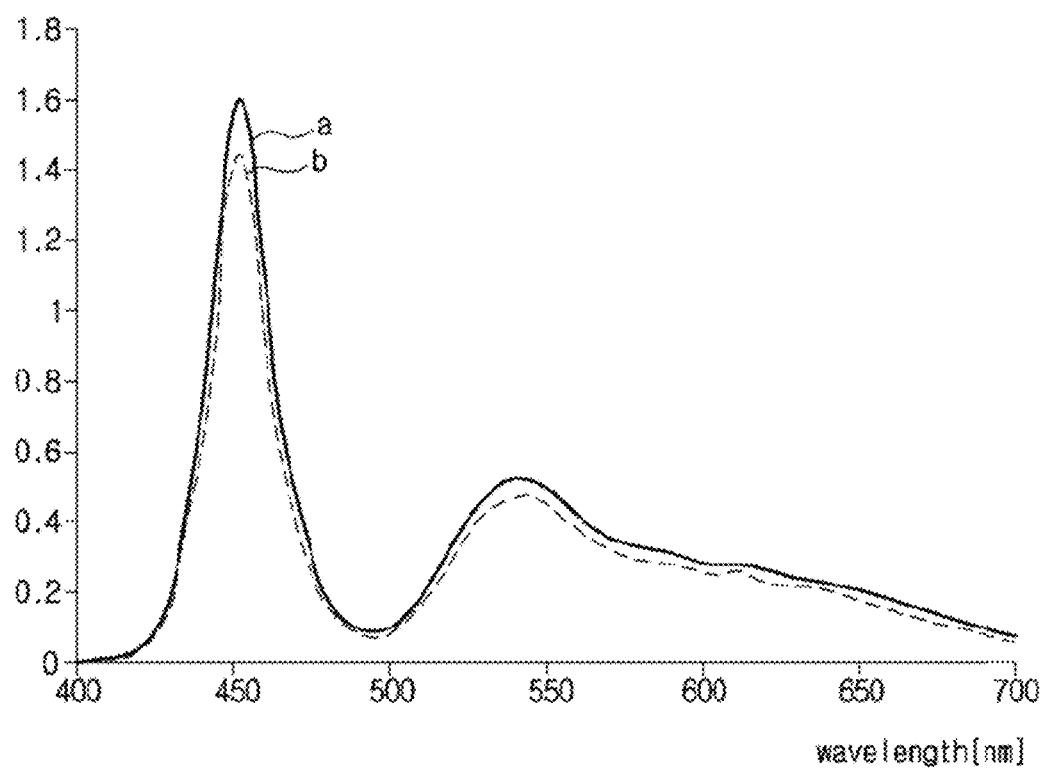
FIG. 18 is a view showing frequency spectra of incident light and emitted light of a polarization film when a display apparatus is turned on according to an exemplary embodiment.

FIG. 18 is a view showing frequency spectra of incident light and emitted light of a polarization film when a display apparatus is turned on according to an exemplary embodiment. Here, incident light may refer to light of a second polarization that is made incident from the display panel 100, and emitted light may include light of the second polarization transmitted through the polarization film 200 out of the incident light and light of first polarization reflected by the polarization film 200. In FIG. 18, "a" indicates incident light and "b" indicates emitted light.

As described above, the first polarization layer 210 and the second polarization layer 220 may have the same refractive index with respect to the second polarization, and therefore the polarization film 200 may allow light of the second polarization to transmit through the polarization film 200. Specifically, the polarization film 200 may allow the transmission of about 90% of the light of the second polarization, and absorb about 10% of the light of the second polarization.

For example, when a center luminance value of the upper plate surface of the display panel 100 on which an image is displayed is about 500 nit, a luminance value of light of the second polarization transmitted through the polarization film 200 may be 450 nit corresponding to 90% of 500 nit. Thus, a significant reduction in the luminance is not generated when compared with an image before the polarization film 200 is adhered to the display panel.

Meanwhile, the emitted light of the polarization film 200 may include light of the first polarization that is reflected by the polarization film 200 out of external light. Because of this, a fine color change may occur. However, a luminance value of light of the second polarization that has been made incident from the display panel 100 and transmitted through the polarization film 200 is large, and therefore the color change that occurs may be insignificant.

Referring to FIG. 18, it can be seen that the spectrum of the incident light "a" made incident from the display panel 100 and the spectrum of the emitted light "b" emitted from the surface of the polarization film 200 are not significantly different from each other. As described above, a difference between the spectra may be a result obtained when light of the second polarization of about 10% out of the incident light is absorbed and light of the first polarization out of the external light "b" is reflected.

When located on a chromaticity diagram, color coordinates corresponding to the spectrum of the incident light "a" of FIG. 18 are (0.271, 0.258). In addition, color coordinates corresponding to the spectrum of the emitted light "b" are (0.271, 0.257). A y value between the color coordinates is reduced by 0.001, but this is hardly detected with the naked eye.

Thus, when displaying an image in the ON state of the power supply of the display apparatus, distortion of the color due to adhesion of the polarization film 200 may not occur.

FIG. 19 is a flowchart showing a manufacturing method for a polarization film according to an exemplary embodiment.

First, in operation 500, a thickness d corresponding to color coordinates of a mirror image to be projected may be determined. The thickness corresponding to the color coordinates of the mirror image may refer to a thickness of the first polarization layer 210 that absorbs a complementary color of the color defined by the color coordinates.

The thickness d may be reduced as the wavelength of light showing the color defined by the color coordinates becomes longer.

Next, in operation 510, a first polarization layer made of a birefringent material may be laminated to have the thickness d. The birefringent material may refer to a substance having different refractive indexes with respect to a first polarization and a second polarization which are perpendicular to each other.

In operation 520, a second polarization layer made of a non-birefringent material may be laminated after the first polarization layer is laminated. The non-birefringent material may refer to a substance having a same refractive index with respect to the first polarization and the second polarization which are perpendicular to each other.

As a result, reflection of light of the first polarization or light of the second polarization may occur at a boundary between the first polarization layer 210 and the second polarization layer 220.

In operation S530, it is determined whether a number of layers laminated is greater than or equal to a threshold number. When it is determined that the number of layers is greater than or equal to the threshold number (S530, YES), an adhesive layer may be formed on one surface in operation S540. The adhesive layer 230 may be adhered to the upper plate surface of the display panel 100 in the future. The reflectance of light may be increased along with an increase in the number of the laminated layers. Thus, the threshold number may be set according to the reflectance to be produced.

When it is determined that the number of layers laminated is less than the threshold number (S530, NO), the first polarization layer 210 may be laminated again, and then the second polarization layer 220 may be laminated.

The case in which the display panel 100 has the structure of the liquid crystal display panel has been described so far, but the present inventive concept may be equally applied to the display panel 100 that spontaneously generates light such as in the structure of an OLED panel.

As is apparent from the above description, according to the polarization film, the display apparatus including the polarization film, and the manufacturing method for the display apparatus, the polarization film may be adhered to the display panel without including a glass coated with a metal, thereby providing the display apparatus that performs a mirror function.

According to the polarization film, the display apparatus including the polarization film, and the manufacturing method for the display apparatus, the color coordinates of the mirror image provided through a mirror may be determined by the polarization film, and therefore the color coordinates of the mirror image may be changed by selecting a polarization film according to the preference of a user.

Although a few exemplary embodiments have been shown and described, it will be appreciated by those skilled in the art that changes may be made in these exemplary embodiments without departing from the principles and spirit of the present inventive concept, the scope of which is defined in the claims and their equivalents.

What is claimed is:

1. A polarization film comprising:
   a plurality of first polarization layers that have a first refractive index with respect to a first polarization; and
   a plurality of second polarization layers that have a second refractive index with respect to the first polarization and are arranged in each interval between the plurality of first polarization layers,
   wherein the plurality of first polarization layers reflect light of the first polarization having color coordinates varying based only on a thickness variation of the first polarization layer, at a boundary that touches the plurality of second polarization layers.

2. The polarization film according to claim 1, wherein the plurality of first polarization layers reflect light of the first polarization except for light having a frequency component corresponding to the thickness.

3. The polarization film according to claim 2, wherein the plurality of first polarization layers reflect light of the first polarization having color coordinates that are determined according to the frequency component.

4. The polarization film according to claim 1, wherein the plurality of first polarization layers absorb light having a frequency component corresponding to the thickness of the first polarization layer from among light of the first polarization that is incident on the polarization film.

5. The polarization film according to claim 4, wherein, in the plurality of first polarization layers, the absorbed frequency of light of the first polarization decreases as the thickness of the first polarization layer increases.

6. The polarization film according to claim 1, wherein the plurality of first polarization layers have the second refractive index with respect to a second polarization perpendicular to the first polarization, and the plurality of second polarization layers have the second refractive index with respect to the second polarization.

7. The polarization film according to claim 6, wherein the plurality of first polarization layers and the plurality of second polarization layers transmit light of the second polarization through the polarization film.

8. The polarization film according to claim 1, wherein each of the plurality of first polarization layers is made of a birefringent material.

9. The polarization film according to claim 1, further comprising:

an adhesive layer that is provided on the polarization film to adhere the polarization film to a display panel for displaying an image comprising light of the second polarization, wherein the second polarization is perpendicular to the first polarization.

10. A display apparatus comprising:

a display panel that displays an image comprising light of a second polarization; and a polarization film that is disposed on an outside surface of the display panel in a direction of light transmission from the display panel, and that transmits light of the second polarization through the polarization film to provide the image, wherein the polarization film comprises a plurality of first polarization layers and a plurality of second polarization layers laminated together, the first polarization layers having a different refractive index with respect to the first polarization than the second polarization layers, and wherein, when light of a first polarization perpendicular to the second polarization is incident on the polarization film, the polarization film reflects the light of the first polarization having predetermined color coordinates varying based only on a thickness variation of the first polarization layer.

11. The display apparatus according to claim 10, wherein the polarization film projects a mirror image of an object by reflecting light of the first polarization, and wherein the mirror image has the predetermined color coordinates.

12. The display apparatus according to claim 10, wherein the polarization film reflects light of the first polarization having the predetermined color coordinates at boundaries between the first and second layers.

13. The display apparatus according to claim 10, wherein each of the first layers and each of the second layers have a same refractive index with respect to the second polarization.

14. The display apparatus according to claim 10, wherein the plurality of first polarization layers have a first refractive index with respect to the first polarization, and the plurality of second polarization layers have a second refractive index with respect to the first polarization and are arranged in each interval between the plurality of first polarization layers, and wherein the plurality of first polarization layers reflect light of the first polarization having color coordinates based on a thickness of the first polarization layers, at boundaries that touch the plurality of second polarization layers.

15. The display apparatus according to claim 14, wherein the plurality of first polarization layers reflect light of the first polarization except for light having a frequency component corresponding to the thickness of the first polarization layers.

16. The display apparatus according to claim 15, wherein the plurality of first polarization layers reflect light of the first polarization having color coordinates that are determined according to the frequency component.

17. The display apparatus according to claim 14, wherein the plurality of first polarization layers absorb light having a frequency component corresponding to the thickness of the first polarization layers from among light of the first polarization that is incident on the polarization film.

18. The display apparatus according to claim 17, wherein, in the plurality of first polarization layers, the absorbed frequency of light of the first polarization decreases as the thickness increases.

19. The display apparatus according to claim 14, wherein each of the plurality of first polarization layers and each of the plurality of second polarization layers have the second refractive index with respect to the second polarization.

20. The display apparatus according to claim 14, wherein each of the plurality of first polarization layers is made of a birefringent material.

21. The display apparatus according to claim 10, wherein the polarization film includes an adhesive layer that adheres the polarization film to the display panel.

22. A manufacturing method for a display apparatus comprising:

preparing a display panel that displays an image comprising light of a second polarization;

preparing a polarization film that transmits light of the second polarization through the polarization film, the polarization film includes a plurality of first polarization layers that have a first refractive index with respect to a first polarization and a plurality of second polarization layers that have a second refractive index with respect to the first polarization and are arranged in each interval between the plurality of first polarization layers; and adhering the polarization film to outside surface of the display panel on which the image of the display panel is displayed, wherein the polarization film is prepared such that when light of a first polarization that is perpendicular to the second polarization is incident to the polarization film, the polarization film reflects the light of the first polarization that has predetermined color coordinates varying based only on a thickness variation of the first polarization layer.

23. The manufacturing method according to claim 22, wherein the preparing of the polarization film includes preparing the polarization film that projects a mirror image of an object by reflecting light of the first polarization, the mirror image having the predetermined color coordinates.

24. The manufacturing method according to claim 22, wherein the preparing of the polarization film includes repeatedly laminating two layers, each having a different refractive index with respect to the first polarization.

25. The manufacturing method according to claim 24, wherein the preparing of the polarization film includes preparing the polarization film that reflects light of the first polarization having the predetermined color coordinates at boundaries of the two layers.

26. The manufacturing method according to claim 24, wherein, each of the two layers have a same refractive index with respect to the second polarization.

27. The manufacturing method according to claim 22, wherein the preparing of the polarization film includes repeatedly laminating a first polarization layer having a first refractive index with respect to the first polarization, and a second polarization layer having a second refractive index with respect to the first polarization.

28. The manufacturing method according to claim 27, wherein the repeatedly laminating of the first polarization layer and the second polarization layer includes laminating the first polarization layers that have a thickness corresponding to the color coordinates so that light of the first polarization having the color coordinates is reflected.

29. The manufacturing method according to claim 28, wherein the laminating of the first polarization layer includes determining the thickness of the first polarization layer so that light of a frequency component determined by the color coordinates is removed from the reflected light of the first polarization.

30. The manufacturing method according to claim 27, wherein the repeatedly laminating of the first polarization layer and the second polarization layer includes laminating the first polarization layer and the second polarization layer having the second refractive index with respect to light of the second polarization so that the polarization film transmits light of the second polarization through the polarization film.

31. The manufacturing method according to claim 27, wherein the first polarization layer is made of a birefringent material.

32. The manufacturing method according to claim 22, wherein the preparing of the polarization film includes preparing an adhesive layer that adheres the polarization film to the display panel.

33. A display apparatus comprising:
a display panel; and
a polarization film provided on an outside surface of the display panel in a direction of transmission of light from the display panel,
wherein the polarization film comprises:
a first layer having a first refractive index at a first polarization and a second refractive index that is different from the first refractive index at a second polarization, and
a second layer having the second refractive index at the first polarization and at the second polarization,
wherein the first layer reflects light of the first polarization having color coordinates varying based only on a thickness variation of the first layer, at a boundary that touches the second layer.

34. The display apparatus according to claim 33, wherein the first layer is made of a birefringent material.

35. The display apparatus according to claim 34, wherein the second layer is made of a material having no birefringence.

36. The display apparatus according to claim 33, wherein the polarization film comprises a plurality of the first layers and a plurality of the second layers, the first layers alternating with the second layers.

37. The display apparatus according to claim 33, wherein the polarization film is adhered to the display panel with an adhesive layer.

* * * * *